(12) United States Patent
Yao et al.

(10) Patent No.: US 12,549,939 B2
(45) Date of Patent: Feb. 10, 2026

(54) COMMUNICATION METHOD FOR TERMINAL AND COMMUNICATION APPARATUS

(71) Applicant: Huawei Technologies Co., Ltd., Shenzhen (CN)

(72) Inventors: Qinbo Yao, Shanghai (CN); Ruixin Wang, Shanghai (CN); Lei Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 18/302,509

(22) Filed: Apr. 18, 2023

(65) Prior Publication Data

US 2023/0262452 A1 Aug. 17, 2023

Related U.S. Application Data

(63) Continuation of application No. PCT/CN2020/122293, filed on Oct. 20, 2020.

(51) Int. Cl.
*H04W 8/24* (2009.01)

(52) U.S. Cl.
CPC .................... *H04W 8/24* (2013.01)

(58) Field of Classification Search
CPC .......... H04W 8/22; H04W 8/24; H04W 8/183
See application file for complete search history.

(56) References Cited

U.S. PATENT DOCUMENTS

2018/0084539 A1* 3/2018 Kubota ................ H04W 76/15
2019/0069193 A1   2/2019 Astrom et al.
2020/0229076 A1* 7/2020 Jin ....................... H04W 48/14
2022/0109976 A1* 4/2022 Ozturk ................. H04W 76/27
2022/0408518 A1* 12/2022 Bergström .......... H04W 60/005
(Continued)

FOREIGN PATENT DOCUMENTS

CN     104410517 B     12/2018
CN     106921503 B      2/2020

OTHER PUBLICATIONS

Vivo (Moderator), "Report of phase 1 Multi-SIM email discussion," RP-191898, 3GPP TSG-RAN WG Meeting #85, Newport Beach, USA, Sep. 16-20, 2019, XP051782444, total 36 pages.
(Continued)

*Primary Examiner* — Congvan Tran
(74) *Attorney, Agent, or Firm* — Conley Rose, P.C.

(57) ABSTRACT

A communication method includes receiving a first capability query request from a first access device; sending a first capability reporting message to the first access device; receiving a second capability query request from a second access device; and sending a second capability reporting message to the second access device. Neither a first terminal capability nor a second terminal capability is greater than a capability specification of the terminal, the capability specification of the terminal is shared by a first user and a second user, and a sum of the first terminal capability and the second terminal capability is greater than the capability specification of the terminal. Hence, when a single user has a service to be executed, an access device may allocate a corresponding resource to the service of the user based on a reported higher terminal capability.

20 Claims, 13 Drawing Sheets

(56) References Cited

U.S. PATENT DOCUMENTS

2023/0047213 A1* 2/2023 Chen ................ H04W 60/005
2023/0091739 A1* 3/2023 Sabouri-Sichani .........................
H04W 72/0453
370/329

OTHER PUBLICATIONS

China Telecom, "Support of UE capabilities coordination for Dual Tx/Dual Rx Multi-USIM UEs," R2-2008832, 3GPP TSG-RAN WG2 Meeting #112e, Electronic, Oct. 2-13, 2020, XP52361886A, total 4 pages.

"IEEE Standard for Local and metropolitan area networks—Part 15.7: Short-Range Wireless Optical Communication Using Visible Light," IEEE Std 802.15.7™—2011, Sep. 6, 2011, 309 pages.

Bolton, M., et al., "IEEE 802.20: Mobile Broadband Wireless Access," https://www.researchgate.net/publication/3436161, IEEE Wireless Communications, Feb. 2007, 13 pages.

"IEEE Standard for Information technology—Telecommunications and information exchange between systems Local and metropolitan area networks—Specific requirements Part 11: Wireless LAN Medium Access Control (MAC) and Physical Layer (PHY) Specifications," IEEE Std 802.11™—2016, 1767 pages.

\* cited by examiner

CONT. FROM FIG. 7A | CONT. FROM FIG. 7A

705a: The SIM card 1 sends a random access connection setup request on an NUL by using a corresponding air interface message RRCSetupRequest 705b: For the SIM card 1, perform resource allocation by using a corresponding air interface message RRCSetup (the resource does not include an SUL)

705c: For the SIM card 1, indicate completion of resource configuration by using a corresponding air interface message RRCRRCSetupComplete 706: The base station queries a UE capability corresponding to the SIM card 1, and the UE completes capability reporting 706a: For the SIM card 1, perform a capability query by using a corresponding air interface message UECapabilityEnquiry 706b: For the SIM card 1, perform capability reporting by using a corresponding air interface message UECapabilityInformation 707: The base station allocates a specified resource to the SIM card 1 of the UE based on the UE capability 707a: For the SIM card 1, perform resource allocation by using a corresponding air interface message RRCReconfiguration (the resource does not include the SUL)

707b: For the SIM card 1, indicate completion of resource configuration by using a corresponding air interface message RRCReconfigurationComplete

FIG. 7B

COMMUNICATION METHOD FOR TERMINAL AND COMMUNICATION APPARATUS

CROSS-REFERENCE TO RELATED APPLICATIONS

This is a continuation of International Patent Application No. PCT/CN2020/122293 filed on Oct. 20, 2020, the disclosure of which is hereby incorporated by reference in its entirety.

TECHNICAL FIELD

Embodiments of this application relate to the field of communication technologies, and in particular, to a communication method for a terminal and a communication apparatus.

BACKGROUND

In the conventional technology, two or more subscriber identity module (SIM) cards may be generally disposed inside a terminal, and each SIM card may correspond to one user.

A dual-SIM dual-active (DSDA) terminal is used as an example. To ensure that services of two users corresponding to two SIM cards can be simultaneously executed (that is, service concurrency), the terminal may separately report, to an access device, terminal capabilities corresponding to the two SIM cards. The two SIM cards share a capability specification of the terminal, and a sum of the terminal capabilities corresponding to the two SIM cards is equal to the capability specification of the terminal. Afterward, the access device allocates a corresponding resource to each SIM card based on a terminal capability corresponding to each SIM card. Therefore, the users corresponding to the two SIM cards can concurrently execute the services respectively based on the resources allocated by the access device. With popularization of a multi-SIM-card terminal, it is necessary to study how to further improve overall performance of the multi-SIM-card terminal.

SUMMARY

Embodiments of this application provide a communication method for a terminal and a communication apparatus, to improve overall performance of a terminal with a plurality of SIM cards.

According to a first aspect, an embodiment of this application provides a communication method for a terminal. The method may be performed by a terminal or a chip used in a terminal. The method includes receiving a first capability query request from a first access device, where the first capability query request is used to query a first terminal capability corresponding to a first user; sending a first capability reporting message to the first access device, where the first capability reporting message carries indication information of the first terminal capability; receiving a second capability query request from a second access device, where the second capability query request is used to query a second terminal capability corresponding to a second user; and sending a second capability reporting message to the second access device, where the second capability reporting message carries indication information of the second terminal capability. Neither the first terminal capability nor the second terminal capability is greater than a capability specification of the terminal, the capability specification of the terminal is shared by the first user and the second user, and a sum of the first terminal capability and the second terminal capability is greater than the capability specification of the terminal.

The first access device and the second access device may be a same access device, or may be different access devices.

Based on the foregoing solution, a terminal capability reported by a single user may be higher than that in the conventional technology, and a sum of a reported terminal capability corresponding to the first user and a reported terminal capability corresponding to the second user is greater than the capability specification of the terminal. Therefore, when the single user has a service to be executed, the access device may allocate corresponding resources to the service of the user based on a reported higher terminal capability corresponding to the user. Compared with the conventional technology, performance of the terminal when the single user has a service to be executed can be improved. Because a scenario of service concurrency does not always exist, using the foregoing solution helps improve overall performance of a terminal with a plurality of SIM cards.

In a possible implementation method, the capability specification of the terminal includes one or more of the following: a maximum quantity of cells supported by the terminal for carrier aggregation; a maximum quantity of multi-input multi-output (MIMO) layers supported by the terminal; and a supplementary uplink feature of the terminal.

Then, when the two users have services to be concurrently executed, in this embodiment of this application, a terminal capability corresponding to one of the users may be actively rolled back to reduce a terminal capability that needs to be occupied by the user such that a part of a terminal capability may be reserved for the other user, thereby implementing service concurrency. For example, when it is determined that the first user is executing a first service and the second user needs to initiate a second service, or it is determined that the first user needs to initiate a first service and the second user is executing a second service, this embodiment of this application provides different capability fallback methods, including but not limited to the following.

In a first possible implementation method, a capability fallback message is sent to the access device. The capability fallback message is used to reduce a terminal capability used by the first user.

For example, when the first user is executing the first service and the second user needs to initiate the second service, the terminal capability used by the first user is reduced by sending the capability fallback message, and a part of a terminal capability may be reserved for the second user, so that a second terminal device can execute the second service, thereby implementing concurrent execution of the first service and the second service. For another example, when the first user needs to initiate the first service and the second user is executing the second service, the terminal capability used by the first user is reduced by sending the capability fallback message, so that a sum of the terminal capability used by the first user and a terminal capability used by the second user does not exceed the capability specification of the terminal, and the first user can execute the first service, thereby implementing concurrent execution of the first service and the second service.

Optionally, the capability fallback message carries first assistance information, and the first assistance information carries one or more pieces of the following information: indication information indicating a quantity of cells except a primary cell to which a capability of the terminal is to be reduced; indication information indicating a maximum bandwidth to which the capability of the terminal is to be reduced at a low frequency; indication information indicating a maximum bandwidth to which the capability of the terminal is to be reduced at a high frequency; indication information indicating a quantity of downlink MIMO layers to which the capability of the terminal is to be reduced at a low frequency; indication information indicating a quantity of uplink MIMO layers to which the capability of the terminal is to be reduced at a low frequency; indication information indicating a quantity of downlink MIMO layers to which the capability of the terminal is to be reduced at a high frequency; indication information indicating a quantity of uplink MIMO layers to which the capability of the terminal is to be reduced at a high frequency; and indication information indicating that the terminal does not support a supplementary uplink.

Optionally, the first assistance information is UEAssistanceInformation.

In a second possible implementation method, a sounding reference signal is sent to the first access device through N transmit ports, where N is less than a quantity of uplink MIMO layers corresponding to the first user.

Based on the foregoing solution, if the sounding reference signal is sent to the first access device through the N transmit ports, that a quantity of uplink MIMO layers is N is indicated to the first access device, and N is less than the quantity of uplink MIMO layers corresponding to the first user, that is, the first access device is indicated to reduce the quantity of uplink MIMO layers to N. In this way, a terminal capability used by the first user can be reduced. For example, when the first user is executing the first service and the second user needs to initiate the second service, the terminal capability used by the first user is reduced, and a part of a terminal capability may be reserved for the second user such that a second terminal device can execute the second service, thereby implementing concurrent execution of the first service and the second service. For another example, when the first user needs to initiate the first service and the second user is executing the second service, the terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

In a third possible implementation method, channel state information is sent to the first access device. The channel state information carries a rank indication, the rank indication indicates that a quantity of downlink MIMO layers is the same as a value corresponding to the rank indication, and the quantity of downlink MIMO layers is less than or equal to a quantity of downlink MIMO layers corresponding to the first user.

Based on the foregoing solution, the channel state information carrying the rank indication is sent, to indicate that the quantity of downlink MIMO layers is the same as the value corresponding to the rank indication, that is, indicate the access device to reduce the quantity of downlink MIMO layers to the value corresponding to the rank indication. In this way, a terminal capability used by the first user can be reduced. For example, when the first user is executing the first service and the second user needs to initiate the second service, the terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, the terminal capability used by the first user is reduced such that a sum of the terminal capability used by the first user and a terminal capability used by the second user does not exceed the capability specification of the terminal, and the first user can execute the first service, thereby implementing concurrent execution of the first service and the second service.

In a fourth possible implementation method, a primary cell corresponding to the first user is used, but a secondary cell corresponding to the first user is not used.

Based on the foregoing solution, the primary cell corresponding to the first user is used, but the secondary cell corresponding to the first user is not used, to simulate a scenario in which the secondary cell has no signal, to trigger the first access device to determine to delete the secondary cell. In this way, a terminal capability used by the first user can be reduced. For example, when the first user is executing the first service and the second user needs to initiate the second service, the terminal capability used by the first user is reduced, and a part of a terminal capability may be reserved for the second user such that a second terminal device can execute the second service, thereby implementing concurrent execution of the first service and the second service. For another example, when the first user needs to initiate the first service and the second user is executing the second service, the terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

In a fifth possible implementation method, a measurement report is sent to the first access device, and the measurement report does not include a measurement report of a secondary cell corresponding to the first user.

Based on the foregoing solution, the terminal does not report the measurement report of the secondary cell corresponding to the first user to the first access device, to indicate the first access device not to add the secondary cell. In this way, a terminal capability currently supported by the first user can be reduced. For example, when the first user is executing the first service and the second user needs to initiate the second service, a terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, a terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

Subsequently, after the first service or the second service ends, the terminal capability used by the first user may be restored. In a possible implementation method, a capability restoration message is sent to the first access device. The capability restoration message is used to improve the terminal capability used by the first user.

Optionally, the capability restoration message carries second assistance information, and the second assistance information carries one or more pieces of the following information: indication information indicating a quantity of cells except a primary cell to which the capability of the terminal is to be increased; indication information indicating a maximum bandwidth to which the capability of the terminal is to be increased at a low frequency; indication information indicating a maximum bandwidth to which the capability of the terminal is to be increased at a high frequency; indication information indicating a quantity of downlink MIMO layers to which the capability of the terminal is to be increased at a low frequency; indication information indicating a quantity of uplink MIMO layers to which the capability of the terminal is to be increased at a low frequency; indication information indicating a quantity of downlink MIMO layers to which the capability of the terminal is to be increased at a high frequency; indication information indicating a quantity of uplink MIMO layers to which the capability of the terminal is to be increased at a high frequency; and indication information indicating that the terminal supports a supplementary uplink.

Optionally, the second assistance information is UEAssistanceInformation.

According to a second aspect, an embodiment of this application provides a communication apparatus, including a processor and an interface circuit. The processor is configured to communicate with another apparatus through the interface circuit, to implement the method according to the first aspect. There are one or more processors.

According to a third aspect, an embodiment of this application provides a communication apparatus. The apparatus may be a terminal, or may be a chip used in the terminal. The apparatus has a function for implementing the method according to the first aspect. The function may be implemented by hardware, or may be implemented by hardware executing corresponding software. The hardware or the software includes one or more modules corresponding to the function.

According to a fourth aspect, an embodiment of this application provides a communication apparatus, including a processor and a memory. The memory is configured to store computer-executable instructions, and when the communication apparatus runs, the processor executes the computer-executable instructions stored in the memory, to implement the method according to the first aspect.

According to a fifth aspect, an embodiment of this application provides a communication apparatus, including a unit or means configured to perform the steps of the method according to the first aspect.

According to a sixth aspect, an embodiment of this application further provides a computer program product including instructions. When the computer program product runs on a computer, the method according to the first aspect is implemented.

According to a seventh aspect, an embodiment of this application further provides a computer-readable storage medium. The computer-readable storage medium stores instructions. When the instructions are run on a computer, the method according to the first aspect is implemented.

BRIEF DESCRIPTION OF DRAWINGS

FIG. 5A and FIG. 5B to FIG. 9 are schematic flowcharts of communication of UE supporting concurrent dual-SIM services.

DESCRIPTION OF EMBODIMENTS

The technical solutions of this application are mainly applicable to a wireless communication system. The wireless communication system may comply with a wireless communication standard of the Third-Generation Partnership Project (3GPP), or may comply with another wireless communication standard, for example, an 802 series (for example, 802.11, 802.15, or 802.20) wireless communication standard of the Institute of Electrical and Electronics Engineers (IEEE).

Figure 1:
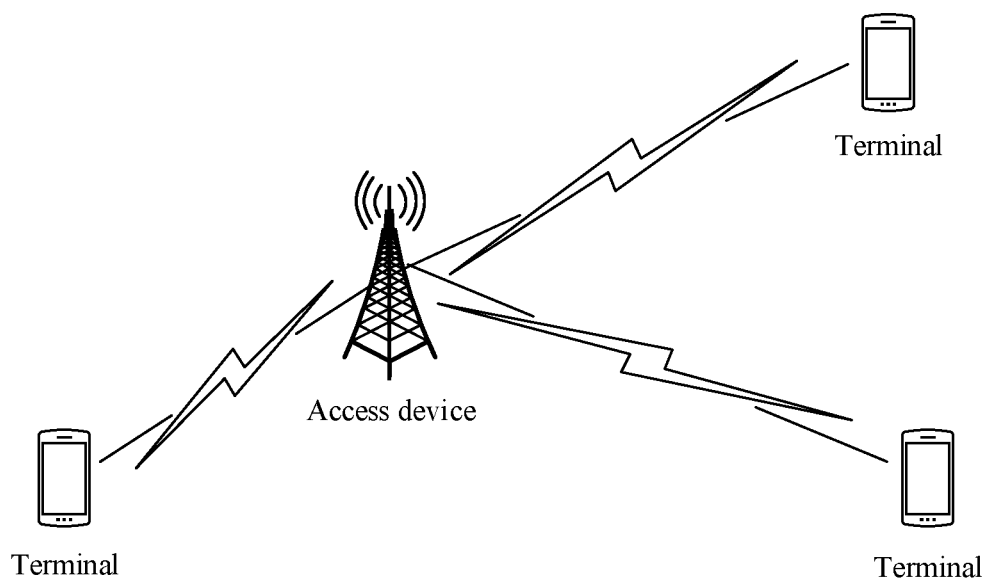
FIG. 1 is a schematic diagram of a structure of a wireless communication system according to an embodiment of this application.

FIG. 1 is a schematic diagram of a structure of a wireless communication system according to an embodiment of this application. The wireless communication system includes an access device and one or more terminals. Depending on different transmission directions, a transmission link from the terminal to the access device is denoted as an uplink (UL), and a transmission link from the access device to the terminal is denoted as a downlink (DL). Data transmission over the uplink may be briefly referred to as uplink data transmission or uplink transmission, and data transmission over the downlink may be briefly referred to as downlink data transmission or downlink transmission.

In the wireless communication system, the access device may provide communication coverage for a specific geographic region by using an integrated or external antenna device. One or more terminals in a communication coverage area of the access device can access the access device. One access device can manage one or more cells. Each cell has one identification. The identification is also referred to as a cell identity (cell ID). From a perspective of a radio resource, a cell is a combination of a downlink radio resource and an uplink radio resource (optional) that is paired with the downlink radio resource.

The terminal and the access device learn of configurations predefined by the wireless communication system, including a radio access technology (RAT) supported by the system, a configuration (for example, basic configurations of a radio frequency band and a carrier) of a radio resource stipulated by the system, and the like. The carrier is a frequency range that complies with a stipulation of the system. The frequency range may be determined jointly based on a center frequency of the carrier (denoted as a carrier frequency) and a bandwidth of the carrier. The configurations predefined by the system may be used as a part of a standard protocol for the wireless communication system, or may be determined through interaction between the terminal and the access device. Content of a related standard protocol may be prestored in memories of the terminal and the access device, or reflected as hardware circuits or software code of the terminal and the access device.

In the wireless communication system, the terminal and the access device each support one or more same RATs, for example, new radio (NR), Long-Term Evolution (LTE), or a RAT for a future evolved system. Specifically, the terminal and the access device each use a same air interface parameter, a same coding scheme, a same modulation scheme, and the like, and communicate with each other based on the radio resource stipulated by the system.

The terminal in this embodiment of application is a device that has a wireless transmission/reception function. The terminal may be deployed on land, for example, an indoor or outdoor device, a handheld device, or an in-vehicle device; or may be deployed on a water surface (for example, on a ship); or may be deployed in the air (for example, on a plane, a balloon, or a satellite). The terminal may be a mobile phone, a tablet computer (or pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a UE, or the like.

The access device is a device that provides a wireless communication function for a terminal. The access device includes but is not limited to a next generation NodeB (gNB) in 5th generation (5G), an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a transmitting and receiving point (TRP), a transmitting point (TP), or a mobile switching center.

Figure 2:
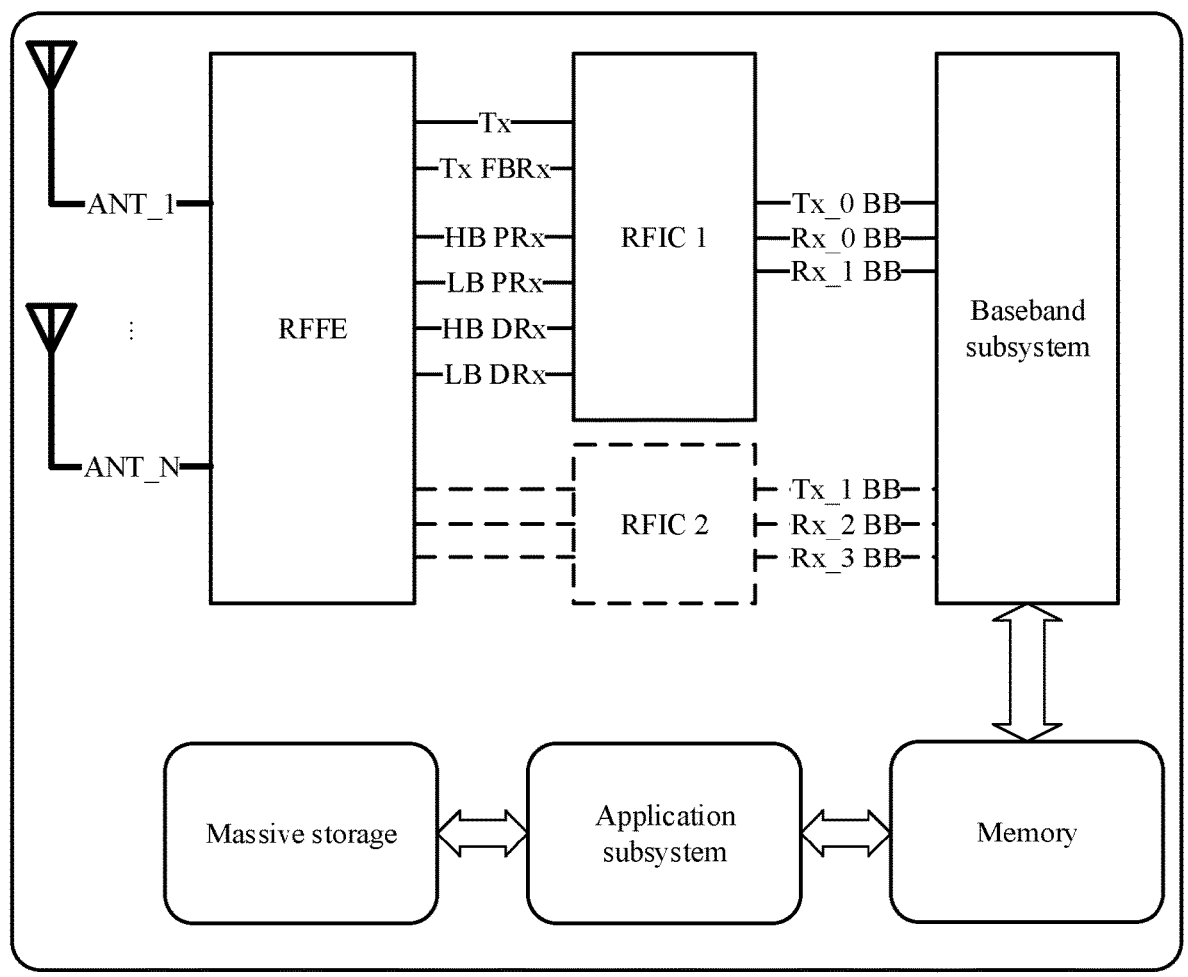
FIG. 2 is a schematic diagram of a structure of a wireless communication device according to an embodiment of this application.

FIG. 2 is a schematic diagram of a structure of a wireless communication device according to an embodiment of this application. The wireless communication device may be the terminal or the access device in embodiments of this application. The wireless communication device may include a plurality of components, for example, an application subsystem, a memory, a massive storage, a baseband subsystem, a radio frequency integrated circuit (RFIC), a radio frequency front-end (RFFE) component, and an antenna (ANT). These components may be coupled through various interconnection buses or in other electrical connection manners.

In FIG. 2, ANT_1 represents a first antenna, ANT_N represents an $N^{th}$ antenna, and N is an integer greater than 1. Tx represents a transmitting path, and Rx represents a receiving path. Different numbers represent different paths. Each path may represent a signal processing channel. FBRx represents a feedback receiving path, PRx represents a primary receiving path, and DRx represents a diversity receiving path. HB represents a high frequency, LB represents a low frequency, and HB and LB indicates that a frequency is comparatively high or low. BB represents a baseband. It should be understood that marks and components in FIG. 2 are merely used for illustration, and are merely used as a possible implementation. Embodiments of this application further include another implementation. For example, the wireless communication device may include more or fewer paths, and include more or fewer components.

The application subsystem may include one or more processors. The processors may include a plurality of processors of a same type, or may include a combination of processors of a plurality of types. In this application, the processor may be a general-purpose processor, or may be a processor designed for a specific field. For example, the processor may be a central processing unit (CPU), a digital signal processor (DSP), or a micro control unit (MCU). Alternatively, the processor may be a graphics processing unit (GPU), an image signal processor (ISP), an audio signal processor (ASP), or an AI processor specially designed for an artificial intelligence (AI) application. The AI processor includes but is not limited to a neural-network processing unit (NPU), a tensor processing unit (TPU), and a processor referred to as an AI engine.

The radio frequency integrated circuit (which includes an RFIC 1, and one or more optional RFICs 2) and the radio frequency front-end component may jointly form a radio frequency subsystem. According to different signal receiving or transmitting paths, the radio frequency subsystem may also be classified into a radio frequency receive channel (or RF receive path) and a radio frequency transmit channel (or RF transmit path). The radio frequency receive channel may receive a radio frequency signal through an antenna, perform processing (for example, amplification, filtering, and down-conversion) on the radio frequency signal to obtain a baseband signal, and transfer the baseband signal to the baseband subsystem. The radio frequency transmit channel may receive a baseband signal from the baseband subsystem, perform processing (such as up-conversion, amplification, and filtering) on the baseband signal to obtain a radio frequency signal, and finally radiate the radio frequency signal to space through an antenna. The radio frequency integrated circuit may be referred to as a radio frequency processing chip or a radio frequency chip.

Similar to the radio frequency subsystem that mainly processes a radio frequency signal, the baseband subsystem mainly processes a baseband signal. The baseband subsystem may extract useful information or data bits from the baseband signal, or convert information or data bits into a to-be-sent baseband signal. The information or the data bits may be data that represents user data or control information such as a voice, a text, or a video. For example, the baseband subsystem may implement signal processing operations such as modulation and demodulation, and encoding and decoding. For different radio access technologies, for example, 5G NR and fourth-generation (4G) LTE, baseband signal processing operations are not totally the same.

Similar to the application subsystem, the baseband subsystem may also include one or more processors. In addition, the baseband subsystem may further include one or more hardware accelerators (HACs). The hardware accelerator may be configured to specially complete some sub-functions with high processing overheads, for example, assembling and parsing a data packet, and encrypting and decrypting a data packet. The sub-functions may also be implemented by using a processor having a general function. However, due to performance or costs, it may be more proper to use the hardware accelerator to implement the sub-functions. In a specific implementation, the hardware accelerator is mainly implemented by using an application-specific integrated circuit (ASIC). Certainly, the hardware accelerator may alternatively include one or more simple processors, for example, an MCU.

The baseband subsystem may be integrated into one or more chips, and the chip may be referred to as a baseband processing chip or a baseband chip. The baseband subsystem may be used as an independent chip, and the chip may be referred to as a modem or a modem chip. The baseband subsystem can be manufactured and sold by the modem chip. The modem chip is sometimes referred to as a baseband processor or a mobile processor. In addition, the baseband subsystem may be further integrated into a larger chip, and is manufactured and sold by the larger chip. The larger chip may be referred to as a system chip, a chip system, a system-on-a-chip (SoC), or a SoC chip for short.

A software component of the baseband subsystem may be built in a hardware component of a chip before the chip is delivered, may be imported from another non-volatile memory into a hardware component of a chip after the chip is delivered, or may be downloaded and updated online through a network.

In addition, the wireless communication device may further include a memory, for example, the memory and the mass storage in FIG. 2. In addition, the application subsystem and the baseband subsystem may further include one or more caches respectively. In a specific implementation, the memory may be classified into a volatile memory and a non-volatile memory (NVM). The volatile memory is a memory in which data stored is lost after a power supply is interrupted. Currently, the volatile memory is mainly a random-access memory (RAM), including a static RAM (SRAM) and a dynamic RAM (DRAM). The non-volatile memory is a memory in which data stored is not lost even if a power supply is interrupted. Common non-volatile memories include a read-only memory (ROM), an optical disc, a magnetic disk, various memories based on a flash memory technology, and the like. Generally, a volatile memory may be used as a memory and a cache, and a non-volatile memory, for example, a flash memory, may be used as a mass storage.

For ease of description, in subsequent embodiments of this application, an example in which the terminal is UE and the access device is a base station is used for description.

Figure 3:
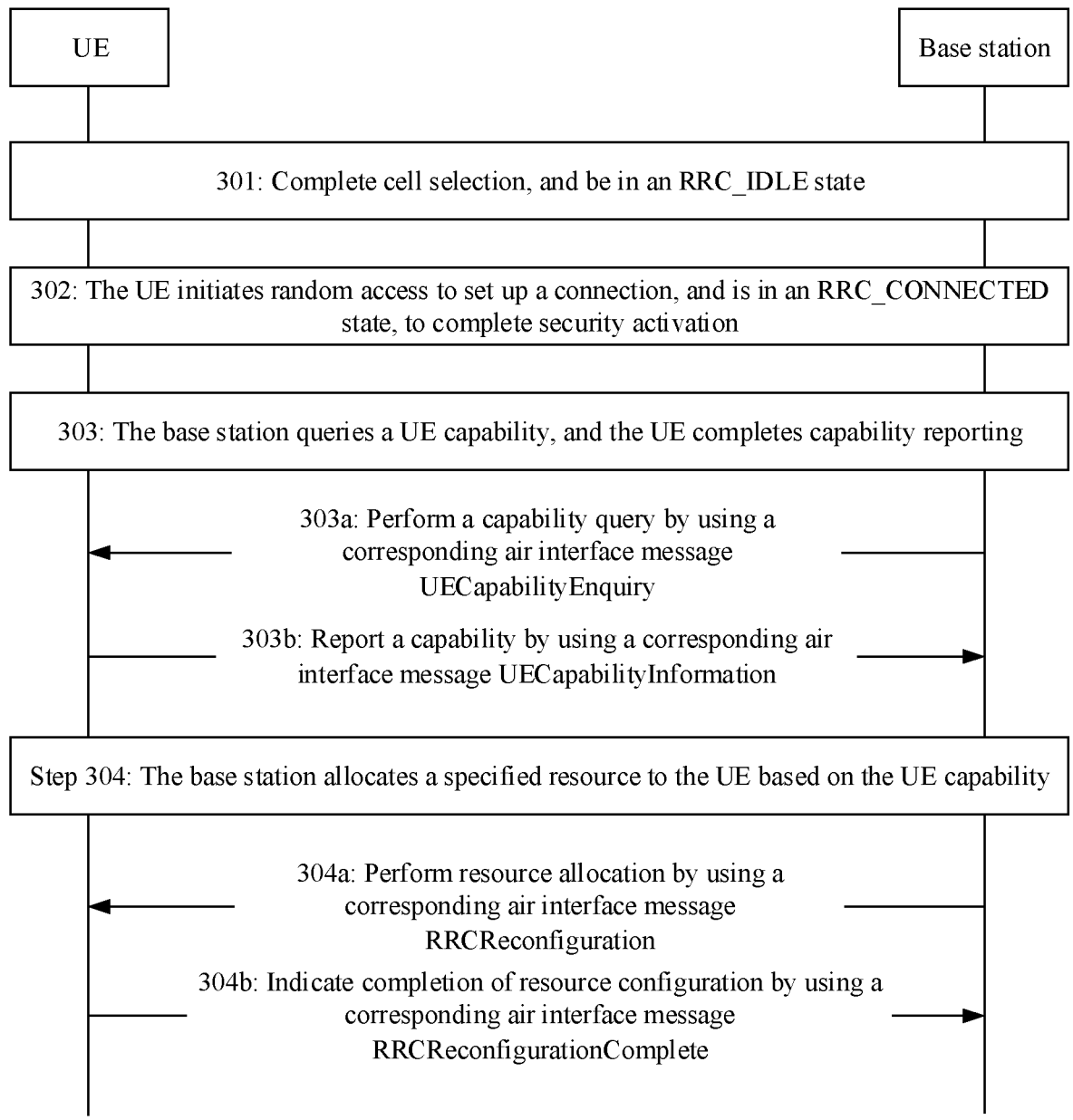
FIG. 3 is a schematic flowchart of communication of a user equipment (UE)

FIG. 3 is a schematic flowchart of communication of UE, including the following steps.

Step 301: The UE completes cell selection, and is in a RRC RRC_IDLE state.

Step 302: The UE initiates random access to set up a connection, and is in an RRC_CONNECTED state, to complete security activation.

Step 303: The base station queries a UE capability, and the UE completes capability reporting.

Step 303 may include the following step 303a and step 303b.

Step 303a: The base station performs a capability query on the UE. For example, the base station sends an air interface message UECapabilityEnquiry to the UE, to request to query the UE capability.

Step 303b: The UE reports the capability to the base station. For example, the UE sends an air interface message UECapabilityInformation to the base station, to report the UE capability.

Step 304: The base station allocates a specified resource to the UE based on the UE capability.

The resource allocated to the UE includes a time domain resource, a frequency domain resource, a configured primary cell, a configured secondary cell, and the like.

Step 304 may include the following step 304a and step 304b.

Step 304a: The base station performs resource allocation on the UE. For example, the base station sends an air interface message RRCReconfiguration to the UE, to request to perform RRC reconfiguration for the UE.

Step 304b: The UE indicates completion of resource configuration to the base station. For example, the UE sends an air interface message RRCReconfigurationComplete to the base station, to indicate completion of RRC reconfiguration.

Based on the foregoing process, resource configuration for the UE can be implemented, so that the UE can implement communication.

After entering the RRC_CONNECTED state, the UE may encounter connection suspension to enter an RRC_INACTIVE state. The UE can enter the RRC_CONNECTED state from the RRC_INACTIVE state again by resuming the connection. When the connection is resumed, the base station allocates a network resource through an air interface message RRCResume, and the UE notifies the base station of completion of network resource allocation through an air interface message RRCResumeComplete.

Figure 4:
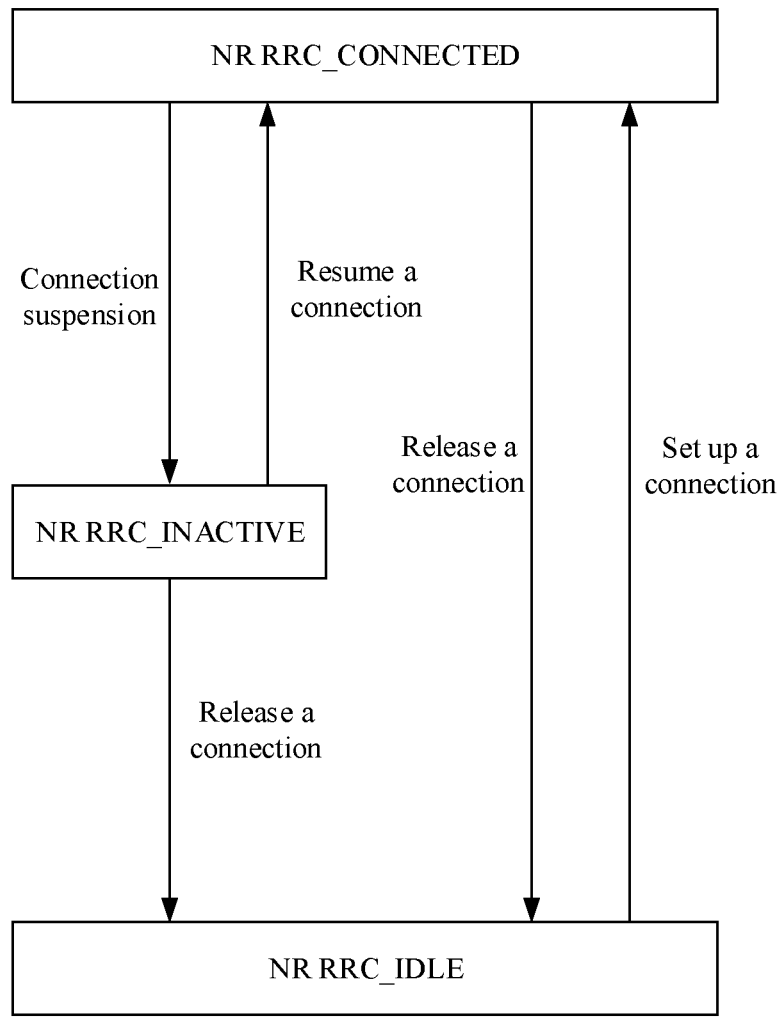
FIG. 4 is a schematic flowchart of transition of a radio resource control (RRC) state.

FIG. 4 is a schematic flowchart of transition of an RRC state. The UE can encounter connection suspension in the RRC_CONNECTED state to enter the RRC_INACTIVE state. The UE can resume the connection in the RRC_INACTIVE state to enter the RRC_CONNECTED state. The UE can release the connection in the RRC_INACTIVE state to enter the RRC_IDLE state. The UE can release the connection in the RRC_CONNECTED state to enter the RRC_IDLE state. The UE can resume the connection in the RRC_IDLE state to enter the RRC_CONNECTED state.

The following describes a UE capability. The UE capability is specific to an entire UE level and indicates a highest capability specification that the UE can support. Currently, two or more SIM cards can be inserted into one UE. Therefore, the UE needs to report a UE capability corresponding to each SIM card. For ease of description, in embodiments of this application, an example in which two SIM cards can be simultaneously inserted into one UE is used for description.

UE capacities include but are not limited to the following.
(1) Supported Maximum Quantity of Cells for Carrier Aggregation For example, CA-BandwidthClassNR indicates a maximum quantity of cells that is supported by the UE for carrier aggregation, and a value of CA-BandwidthClassNR may be 1, 2, 3, 4, 5, 8, or the like.
(2) Supported Maximum Quantity of Multi-Input Multi-Output (MIMO) Layers For example, the supported maximum quantity of MIMO layers includes the following cases.
a. Maximum Quantity of MIMO Layers Supported in a Downlink For example, maxNumberMIMO-LayersPDSCH indicates the maximum quantity of MIMO layers supported in the downlink, and a value may be 2, 4, 8, or the like.
b. Maximum Quantity of MIMO Layers Supported in an Uplink in a Codebook Manner For example, maxNumberMIMO-LayersCB-PUSCH indicates the maximum quantity of MIMO layers supported in the uplink in the codebook manner, and a value may be 1, 2, 4, or the like.
c. Maximum Quantity of MIMO Layers Supported in the Uplink in a Non-Codebook Manner For example, maxNumberMIMO-LayersNonCB-PUSCH is used to indicate the maximum quantity of MIMO layers supported in the uplink in the non-codebook manner, and a value may be 1, 2, 4, or the like.
(3) Supplementary Uplink (SUL) Feature At a near point, the UE may use a normal uplink (NUL). At a far point, the UE may use an SUL. A frequency of the SUL is usually lower than a frequency of the NUL, and a coverage area of the SUL is greater than that of the NUL. After the base station configures the NUL and the SUL for the UE, the UE may use only the NUL, or use only the SUL, or use both the NUL and the SUL during scheduling. Use of the SUL can expand the coverage area and increase an uplink transmit rate.

SUL features include but are not limited to the following:
a. whether the SUL can simultaneously perform sending and receiving;
b. whether to support SUL dynamic switching; and
c. whether to support the following case: the SUL is used to transmit a sounding reference signal (SRS) and the NUL is used to transmit data, or the SUL is used to transmit data and the NUL is used to transmit an SRS is supported.

From a perspective of the UE, sending signaling or data by the UE to the base station is referred to as uplink sending, and receiving signaling or data by the UE from the base station is referred to as downlink receiving. An uplink capability and a downlink capability of the UE may be the same or different.

In the conventional technology, if two SIM cards of dual-SIM UE need to provide services at the same time, for example, one SIM card is used to make a call, and the other SIM card is used to access an internet, when reporting a UE capability, the UE needs to split the UE capability. In this case, a UE capability reported by each SIM card is lower than an overall capability of the UE, and a sum of UE capabilities reported by the two SIM cards is equal to a capability specification of the UE (that is, the overall capability of the UE). In this mode, the UE capability reported by each SIM card is low. Therefore, user experience of each SIM card is affected. For example, if the UE capability reported by each SIM card is 50% of the specification capability of the UE, when only one SIM card subsequently has a service to be executed, the service of the SIM card can use only 50% of the capability specification of the UE at most. Consequently, performance of the SIM card is not high, and user experience is reduced.

Figure 5A:
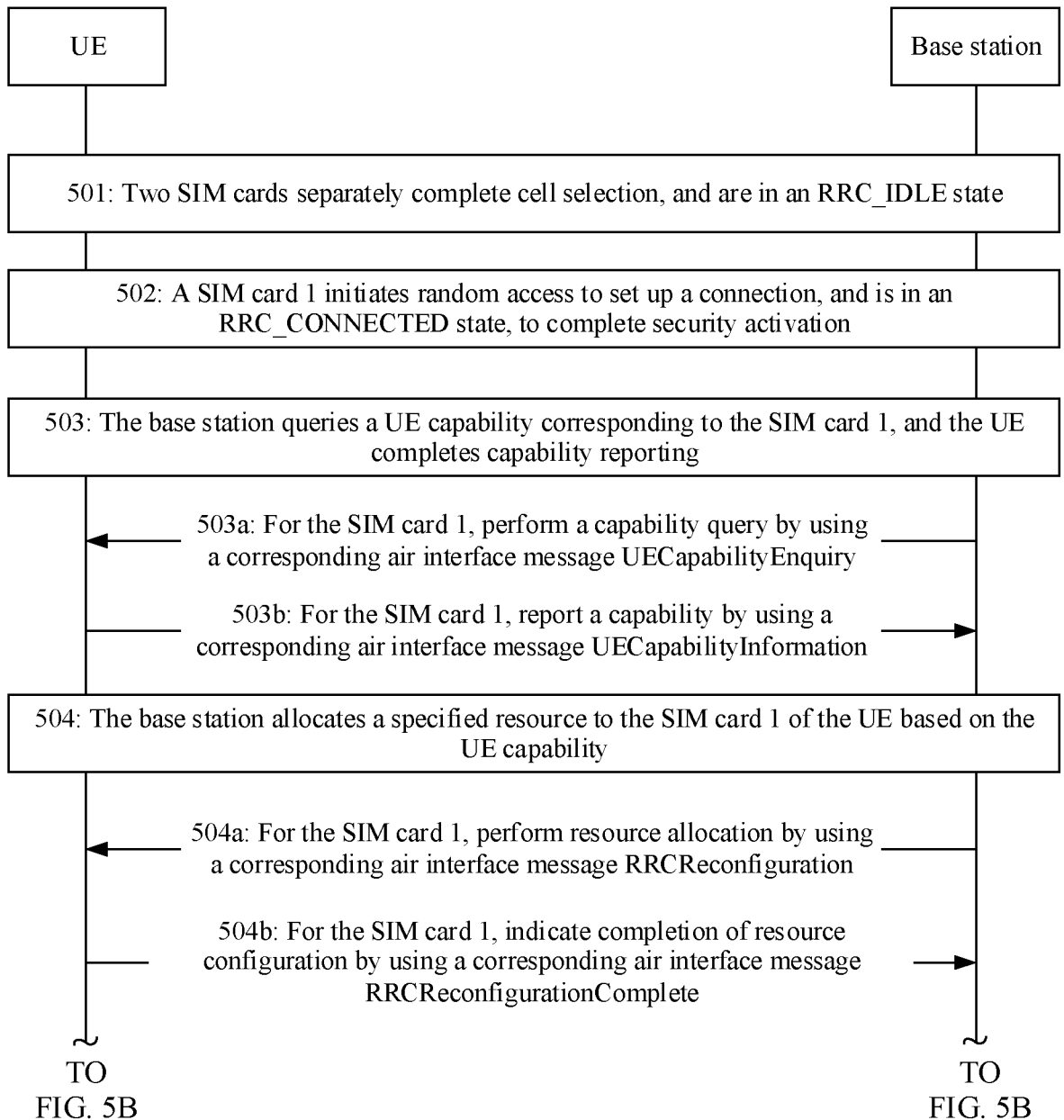
Figure 5B:
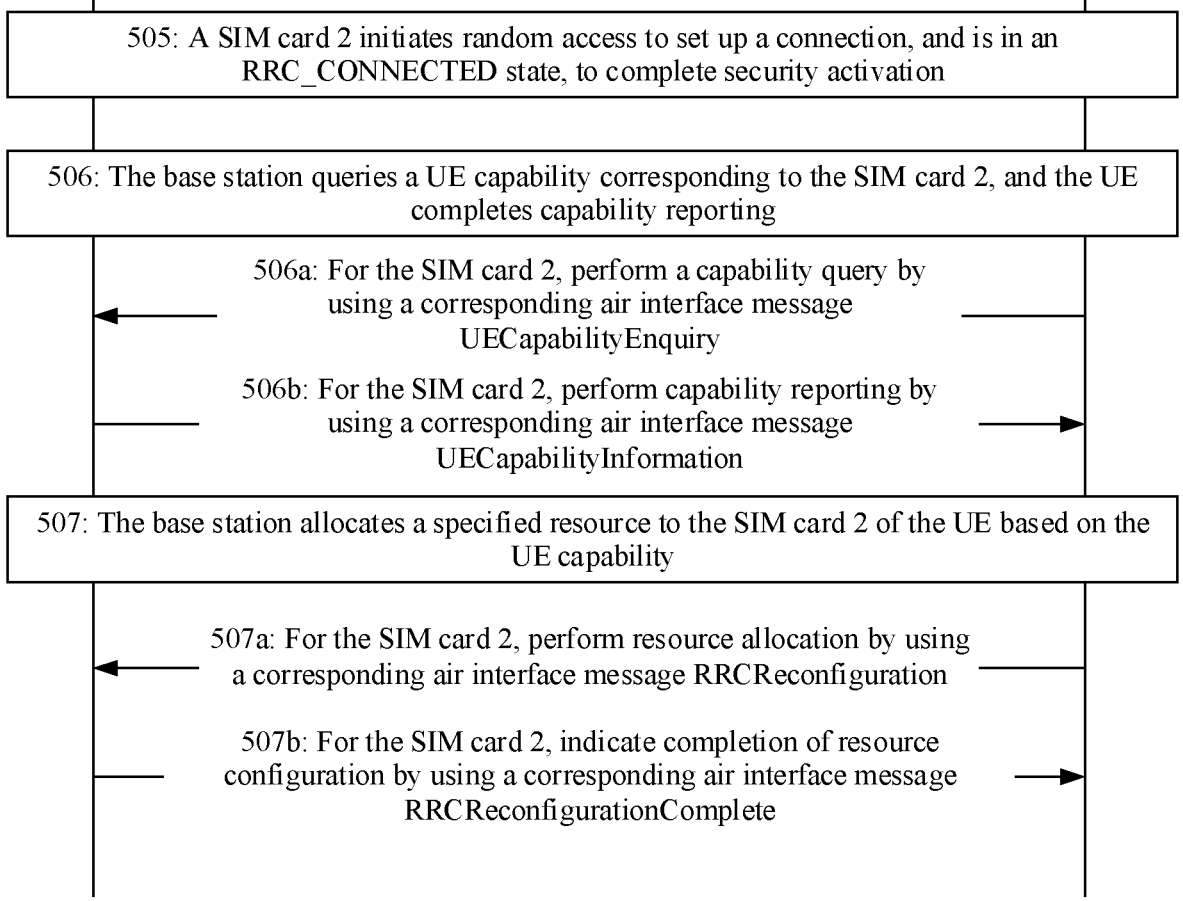

FIG. 5A and FIG. 5B are a schematic flowchart of communication of UE supporting concurrent dual-SIM services, including the following steps.

Step 501: Two SIM cards of the UE separately complete cell selection, and are in an RRC_IDLE state.

Step 502: A SIM card 1 of the UE initiates random access to set up a connection, and is in an RRC_CONNECTED state, to complete security activation.

Step 503: A base station queries a UE capability corresponding to the SIM card 1, and the UE completes capability reporting.

Step 503 includes the following step 503*a* and step 503*b*.

Step 503*a*: The base station performs a capability query on the UE. For example, the base station sends an air interface message UECapabilityEnquiry to the UE, to request to query the UE capability corresponding to the SIM card 1.

Step 503*b*: The UE reports the capability to the base station. For example, the UE sends an air interface message UECapabilityInformation to the base station, to report the UE capability corresponding to the SIM card 1.

Step 504: The base station allocates a specified resource to the SIM card 1 of the UE based on the UE capability corresponding to the SIM card 1.

The resource allocated to the SIM card 1 of the UE includes a time domain resource, a frequency domain resource, a configured primary cell, a configured secondary cell, and the like.

Step 504 includes the following step 504*a* and step 504*b*.

Step 504*a*: The base station performs resource allocation on the UE. For example, the base station sends an air interface message RRCReconfiguration to the UE, to request to perform RRC reconfiguration for the SIM card 1 of the UE.

Step 504*b*: The UE indicates completion of resource configuration to the base station. For example, the UE sends an air interface message RRCReconfigurationComplete to the base station, to indicate completion of RRC reconfiguration.

Step 505: A SIM card 2 of the UE initiates random access to set up a connection, and is in an RRC_CONNECTED state, to complete security activation.

Step 506: The base station queries a UE capability corresponding to the SIM card 2, and the UE completes capability reporting.

Step 506 includes the following step 506*a* and step 506*b*.

Step 506*a*: The base station performs a capability query on the UE. For example, the base station sends an air interface message UECapabilityEnquiry to the UE, to request to query the UE capability corresponding to the SIM card 2.

Step 506*b*: The UE reports the capability to the base station. For example, the UE sends an air interface message UECapabilityInformation to the base station, to report the UE capability corresponding to the SIM card 2.

Step 507: The base station allocates a specified resource to the SIM card 2 of the UE based on the UE capability.

The resource allocated to the SIM card 2 of the UE includes a time domain resource, a frequency domain resource, a configured primary cell, a configured secondary cell, and the like.

Step 507 includes the following step 507*a* and step 507*b*.

Step 507*a*: The base station performs resource allocation on the UE. For example, the base station sends an air interface message RRCReconfiguration to the UE, to request to perform RRC reconfiguration for the SIM card 2 of the UE.

Step 507*b*: The UE indicates completion of resource configuration to the base station. For example, the UE sends an air interface message RRCReconfigurationComplete to the base station, to indicate completion of RRC reconfiguration.

Based on the foregoing process, resource configuration for the two SIM cards of the UE can be separately implemented, so that the UE can implement communication. A sum of the UE capability that is corresponding to the SIM card 1 and that is reported by the UE and the UE capability that is corresponding to the SIM card 2 and that is reported by the UE is equal to a capability specification of the UE.

A problem of the foregoing solution is that the sum of the UE capabilities that are corresponding to the two SIM cards and that are reported by the UE is equal to the capability specification of the UE. As a result, the UE capability reported by each SIM card is low. When a service of only a single SIM card is executed, because a UE capability corresponding to the single SIM card is low, the service of the SIM card cannot obtain a high-specification UE capability, and therefore experience such as a maximum rate and a minimum delay cannot be obtained.

To resolve the foregoing problem, a general idea of embodiments of this application is as follows.

(a) When the dual-SIM UE reports the UE capabilities based on a procedure specified by standard protocols, the UE can report the high-specification capability of the UE for each SIM card. The sum of the UE capability corresponding to the SIM card 1 and the UE capability corresponding to the SIM card 2 may exceed the capability specification of the UE. Therefore, when there is no dual-SIM concurrent service, both the SIM card 1 and the SIM card 2 can support service provisioning with the high-specification UE capability.

(b) When a dual-SIM concurrency scenario occurs, for example, the SIM card 1 first performs a service, and when the SIM card 1 detects that the SIM card 2 is to initiate a service, the UE sends a capability fallback message to a network corresponding to the SIM card 1. The capability fallback message is used to trigger the network to reconfigure or reschedule the UE capability corresponding to the SIM card 1, so that the UE supports concurrent services. Alternatively, the SIM card 2 first performs a service, and when the SIM card 1 needs to initiate a service, the UE sends a capability fallback message to a network corresponding to the SIM card 1. The capability fallback message is used to trigger the network to reconfigure or reschedule the UE capability corresponding to the SIM card 1, so that the UE supports concurrent services.

(c) When the dual-SIM concurrency scenario ends, the UE sends a capability restoration message to the network corresponding to the SIM card 1. The capability restoration message is used to trigger the network to reconfigure or reschedule the UE capability corresponding to the SIM card 1, so that the SIM card 1 can perform a service with the high-specification capability.

Scenarios involved in embodiments of this application include but are not limited to the following.

(a) The SIM card 1 first initiates a service, then the SIM card 2 initiates a service, and the SIM card 1 triggers a capability fallback.

This scenario is equivalent to the following scenario: The SIM card 2 first initiates a service, then the SIM card 1 initiates a service, and the SIM card 2 triggers a capability fallback.

(b) The SIM card 2 first initiates a service, and when the SIM card 1 initiates a service, the SIM card 1 triggers a capability fallback.

This scenario is equivalent to the following scenario: The SIM card 1 first initiates a service, and when the SIM card 2 initiates a service, the SIM card 2 triggers a capability fallback.

(c) Services of the SIM card 1 and the SIM card 2 are concurrent, the service of the SIM card 2 ends, and the SIM card 1 triggers capability restoration.

This scenario is equivalent to the following scenario: Services of the SIM card 1 and the SIM card 2 are concurrent, the service of the SIM card 1 ends, and the SIM card 2 triggers capability restoration.

(d) Services of the SIM card 1 and the SIM card 2 are concurrent, the service of the SIM card 1 ends, and the SIM card 1 triggers capability restoration.

This scenario is equivalent to the following scenario: Services of the SIM card 1 and the SIM card 2 are concurrent, the service of the SIM card 2 ends, and the SIM card 2 triggers capability restoration.

In embodiments of this application, a resource fallback or restoration manner includes but is not limited to the following.

(1) The UE sends UE assistance information UEAssistanceInformation to the base station, to indicate to reduce or restore a specified UE capability parameter.

Content of the UEAssistanceInformation is described as follows.

(a) No parameter is carried: Indicate all suppressed parameters are restored.

(b) reducedMaxCCs is carried: Indicate a quantity of cells except a primary cell to which a capability of the UE is to be reduced.

(c) reducedMaxBW-FR1 is carried: Indicate a maximum bandwidth to which the capability of the UE is to be reduced at a low frequency.

(d) reducedMaxBW-FR2 is carried: Indicate a maximum bandwidth to which the capability of the UE is to be reduced at a high frequency.

(e) reducedMIMO-LayersFR1-DL is carried: Indicate a quantity of downlink MIMO layers to which the capability of the UE is to be reduced at a low frequency.

(f) reducedMIMO-LayersFR1-UL is carried: Indicate a quantity of uplink MIMO layers to which the capability of the UE is to be reduced at a low frequency.

(g) reducedMIMO-LayersFR2-DL is carried: Indicate a quantity of downlink MIMO layers to which the capability of the UE is to be reduced at a high frequency.

(h) reducedMIMO-LayersFR2-UL is carried: Indicate a quantity of uplink MIMO layers to which the capability of the UE is to be reduced at a high frequency.

(2) A random access resource selects an NUL or SUL. If the UE needs to access on the SUL but the UE proactively accesses on the NUL, a network can evaluate not to configure the SUL.

(3) If the UE sends an SRS to the base station through a transmit port, it indicates that a network delivers an uplink grant only on this port, that is, it indicates that a quantity of uplink MIMO layers of the network is 1. Alternatively, if the UE sends an SRS to the base station through two transmit ports, it indicates that a network delivers an uplink grant only on the two ports, that is, it indicates that a quantity of uplink MIMO layers of the network is 2.

(4) The UE sends a channel state information (CSI) report to the base station. The CSI report carries a rank indication (RI), and the rank indication indicates that a quantity of downlink MIMO layers of a network is the same as an RI value. In other words, the quantity of downlink MIMO layers is reduced to the RI value.

(5) The UE proactively suspends a secondary cell to simulate a scenario where the secondary cell has no signal. A network determines to delete the secondary cell. Alternatively, if the UE restores a signal of a secondary cell, a network restores use of the secondary cell.

(6) If a primary cell does not report a measurement report (MR) of a secondary cell, a network is indicated not to add the secondary cell. If the primary cell reports the measurement report of the secondary cell, the network is indicated to add the secondary cell.

(7) A primary cell actively triggers re-setup and returns to a primary cell state.

(8) Serial execution is performed on services of the card 1 and the card 2. A service with a higher priority is executed first, and then a service with a lower priority is executed.

In embodiments of this application, a manner in which the network responds to the resource fallback or restoration includes but is not limited to the following.

(1) The base station sends an RRC reconfiguration message RRCReconfiguration to the UE over an air interface. Related configurations are as follows:

(a) for a quantity of cells:
 configure sCellToReleaseList, to indicate to delete a secondary cell;
 configure mrdc-SecondaryCellGroupConfig, to indicate to release or delete a secondary cell group (SCG);
 configure sCellToAddModList, to indicate to add a new secondary cell; and
 configure mrdc-SecondaryCellGroupConfig, to indicate to set up an SCG;

(b) for an SUL:

ServingCellConfig carries supplementaryUplinkRelease, or supplementaryUplinkConfig is not configured in ServingCellConfigCommon, to indicate to delete the SUL; and supplementaryUplink is configured in ServingCellConfig, to indicate to configure the SUL;

(c) for downlink MIMO:

maxMIMO-Layers is configured in PDSCH-ServingCell-Config, to indicate a quantity of downlink MIMO layers configured by the network; and (d) for uplink MIMO:

maxMIMO-Layers is configured in PUSCH-ServingCell-Config, or maxRank or maxRankForDCI-Format0-2-r16 is configured in PUSCH-Config, to indicate a quantity of uplink MIMO layers configured by the network.

(2) The base station sends an RRC setup message RRC Setup to the UE over an air interface. A configuration parameter carried in the message is similar to the foregoing RRCReconfiguration.

(3) The base station sends an RRC resume message RRCResume to the UE over an air interface. A configuration parameter carried in the message is similar to the foregoing RRCReconfiguration.

(4) The base station sends an uplink grant UL Grant to the UE, to indicate a resource on which uplink data can be sent.

The following describes embodiments of this application with reference to specific examples. In the following embodiments corresponding to FIG. 6A and FIG. 6B to FIG. 8, an example in which a SIM card 1 supports a UE capability fallback is used. For an example in which both a SIM card 1 and a SIM card 2 support a fallback, an implementation process is similar, and details are not described.

Figure 6A:
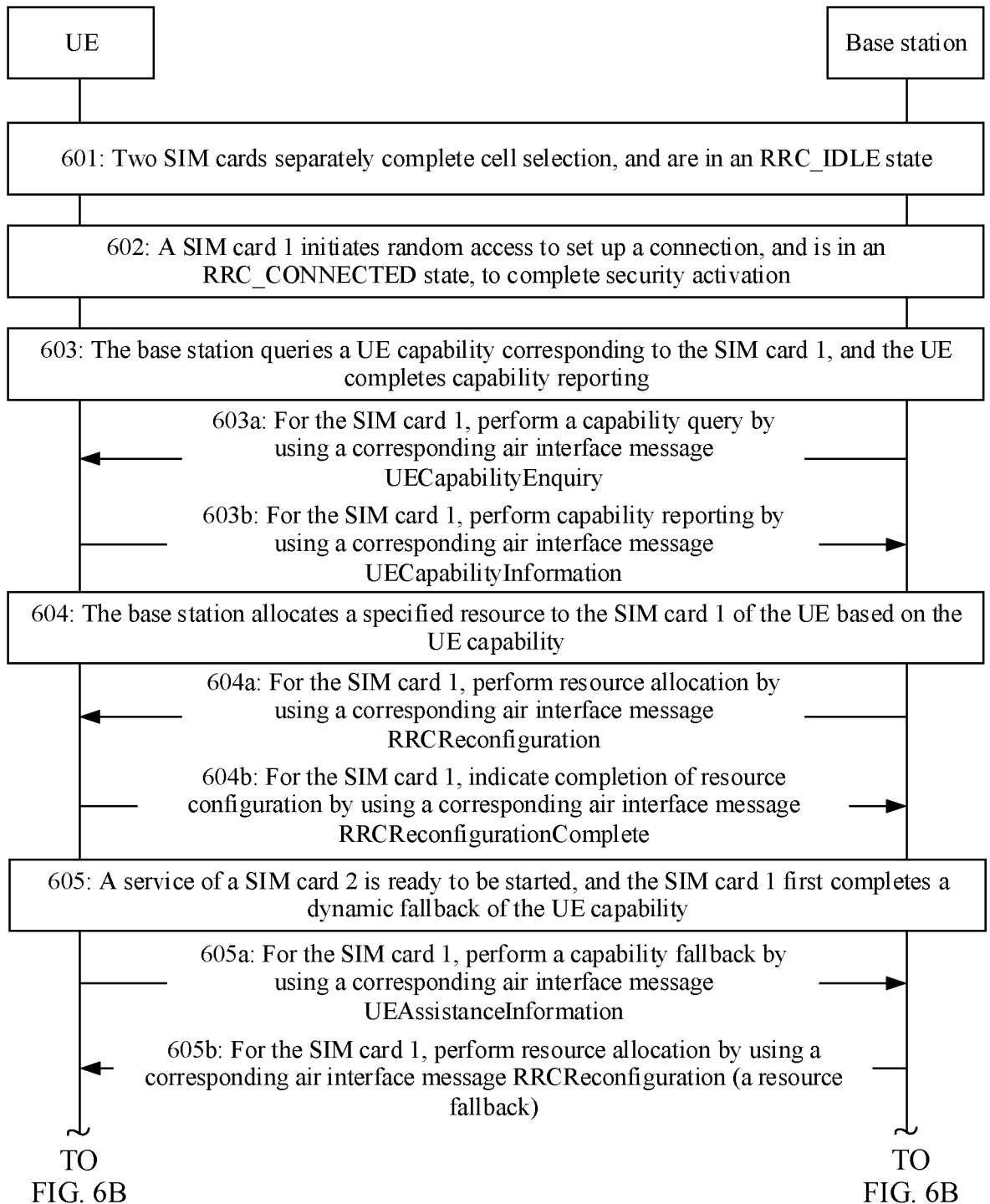
Figure 6B:
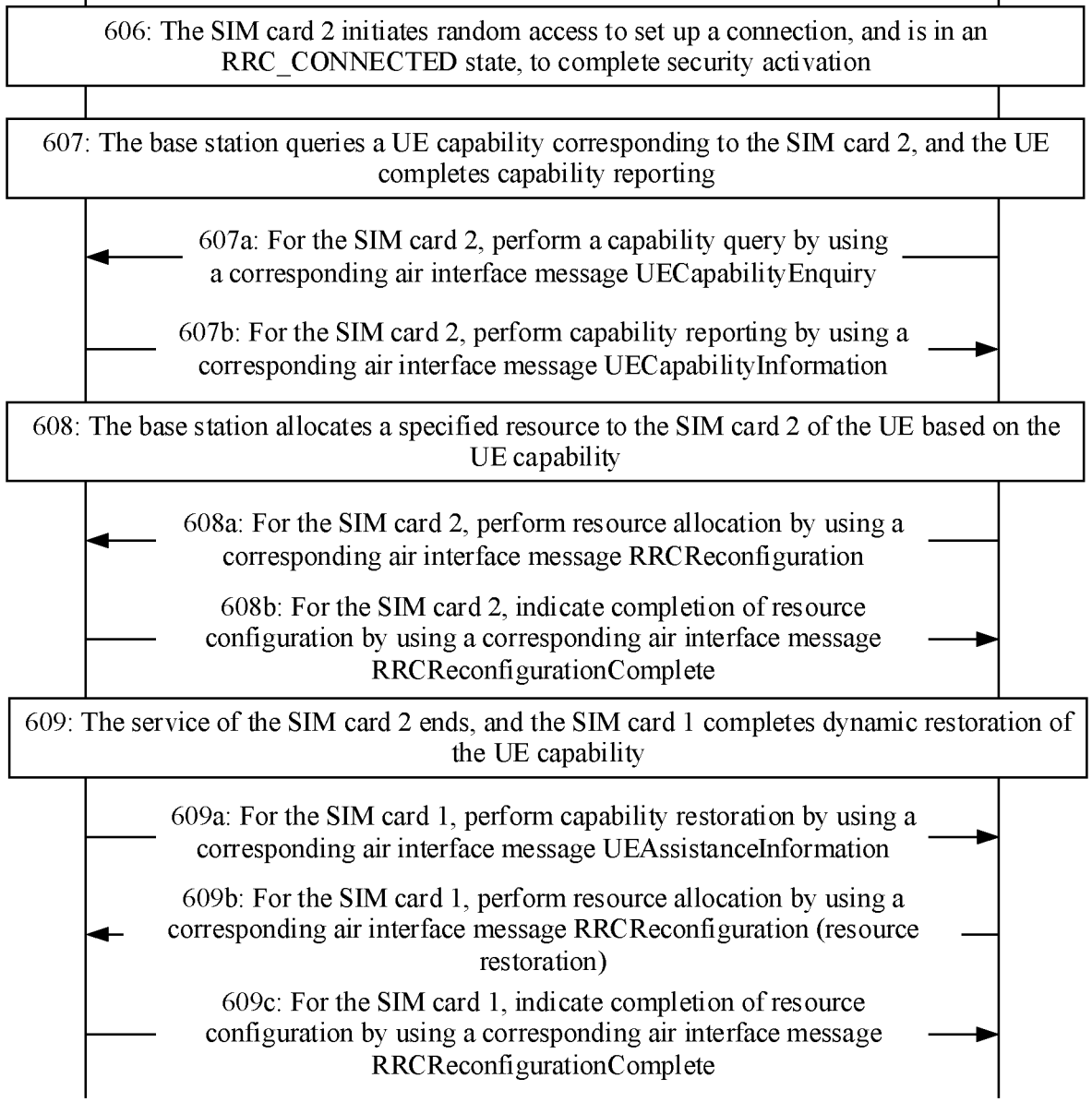

FIG. 6A and FIG. 6B are another schematic flowchart of communication of UE supporting concurrent dual-SIM services. In this embodiment, the SIM card 1 of the UE first initiates a service, and when the SIM card 2 subsequently needs to initiate a service, the SIM card 1 first performs a UE capability fallback, and then the service of the SIM card 2 is initiated. After the service of the SIM card 2 is completed, a UE capability corresponding to the SIM card 1 is restored.

The method includes the following steps.

Step 601: The two SIM cards of the UE separately complete cell selection, and are in an RRC_IDLE state.

Step 602: The SIM card 1 of the UE initiates random access to set up a connection, and is in an RRC_CONNECTED state, to complete security activation.

Step 603: A base station queries a UE capability corresponding to the SIM card 1, and the UE completes capability reporting.

Step 603 includes the following step 603*a* and step 603*b*.

Step 603*a*: The base station performs a capability query on the UE. For example, the base station sends an air interface message UECapabilityEnquiry to the UE, to request to query the UE capability corresponding to the SIM card 1.

Step 603*b*: The UE reports the capability to the base station. For example, the UE sends an air interface message UECapabilityInformation to the base station, to report the UE capability corresponding to the SIM card 1.

Optionally, the UE capability that is corresponding to the SIM card 1 and that is reported by the UE may be a capability specification of the UE (that is, an overall capability of the UE).

Step 604: The base station allocates a specified resource to the SIM card 1 of the UE based on the UE capability corresponding to the SIM card 1.

The resource allocated to the SIM card 1 of the UE includes a time domain resource, a frequency domain resource, a configured primary cell, a configured secondary cell, and the like.

Step 604 includes the following step 604*a* and step 604*b*.

Step 604*a*: The base station performs resource allocation on the UE. For example, the base station sends an air interface message RRCReconfiguration to the UE, to request to perform RRC reconfiguration for the SIM card 1 of the UE.

In this step, the resource allocated to the SIM card 1 of the UE is a resource matching the UE capability that is corresponding to the SIM card 1 and that is reported by the UE. For example, if the UE capability that is corresponding to the SIM card 1 and that is reported by the UE is the overall capability of the UE, the resource allocated to the SIM card 1 of the UE in this step is a resource that matches the overall capability of the UE.

Step 604*b*: The UE indicates completion of resource configuration to the base station. For example, the UE sends an air interface message RRCReconfigurationComplete to the base station, to indicate completion of RRC reconfiguration.

Step 605: A service of the SIM card 2 is ready to be started, and the SIM card 1 first completes a dynamic UE capability fallback.

Step 605 includes the following step 605*a* to step 605*c*.

Step 605*a*: The UE performs the capability fallback to the base station. For example, the UE sends an air interface message UEAssistanceInformation to the base station, to report a UE capability that is after fallback and that is corresponding to the SIM card 1.

For example, when the UE is in a connected mode, the base station indicates, through an air interface, to support reporting of assistance information (for example, overheatingAssistanceConfig is configured to exist in RRCReconfiguration in the foregoing step 604*a*), for a parameter that may be indicated in the UE assistance information (UEAssistanceInformation), a fallback manner is selected as the UE assistance information, and a network response is reconfiguration.

Step 605*b*: The base station performs resource allocation on the UE. For example, the base station sends an air interface message RRCReconfiguration to the UE, to request to perform RRC reconfiguration for the SIM card 1 of the UE.

In this step, the resource allocated to the SIM card 1 of the UE is a resource matching the UE capability that is after the fallback, that is corresponding to the SIM card 1, and that is reported by the UE.

Step 605*c*: The UE indicates completion of resource configuration to the base station. For example, the UE sends an air interface message RRCReconfigurationComplete to the base station, to indicate completion of RRC reconfiguration.

For example, after the SIM card 1 reports the UECapabilityInformation (for example, maxNumberMIMO-LayersCB-PUSCH is two layers), a network performs parameter configuration RRCReconfiguration based on the UE capability (for example, maxMIMO-Layers in PUSCH-ServingCellConfig is two layers, and maxRank in PUSCH-Config is two layers), and before services of the two SIM cards are concurrent, the UE sends the UEAssistanceInformation (for example, reducedMIMO-LayersFR1-UL is 1 layer) to the network. The network performs reconfiguration (for example, maxMIMO-Layers in PUSCH-ServingCellConfig is 1 layer, and maxRank in PUSCH-Config is 1 layer) to complete the dynamic UE capability fallback corresponding to the SIM card 1.

Step 606: The SIM card 2 of the UE initiates random access to set up a connection, and is in an RRC_CONNECTED state, to complete security activation.

Step 607: The base station queries a UE capability corresponding to the SIM card 2, and the UE completes capability reporting.

Step 607 includes the following step 607a and step 607b.

Step 607a: The base station performs a capability query on the UE. For example, the base station sends an air interface message UECapabilityEnquiry to the UE, to request to query the UE capability corresponding to the SIM card 2.

Step 607b: The UE reports the capability to the base station. For example, the UE sends an air interface message UECapabilityInformation to the base station, to report the UE capability corresponding to the SIM card 2.

Step 608: The base station allocates a specified resource to the SIM card 2 of the UE based on the UE capability.

The resource allocated to the SIM card 2 of the UE includes a time domain resource, a frequency domain resource, a configured primary cell, a configured secondary cell, and the like.

Step 608 further includes the following step 608a and step 608b.

Step 608a: The base station performs resource allocation on the UE. For example, the base station sends an air interface message RRCReconfiguration to the UE, to request to perform RRC reconfiguration for the SIM card 2 of the UE.

Step 608b: The UE indicates completion of resource configuration to the base station. For example, the UE sends an air interface message RRCReconfigurationComplete to the base station, to indicate completion of RRC reconfiguration.

Step 609: The service of the SIM card 2 ends, and the SIM card 1 completes dynamic restoration of the UE capability.

Step 609 further includes the following step 609a to step 609c.

Step 609a: The UE performs capability restoration to the base station. For example, the UE sends an air interface message UEAssistanceInformation to the base station, to report a restored UE capability corresponding to the SIM card 1.

Step 609b: The base station performs resource allocation on the UE. For example, the base station sends an air interface message RRCReconfiguration to the UE, to request to perform RRC reconfiguration for the SIM card 1 of the UE.

In this step, the resource allocated to the SIM card 1 of the UE is a resource matching the restored UE capability that is corresponding to the SIM card 1 and that is reported by the UE.

Step 609c: The UE indicates completion of resource configuration to the base station. For example, the UE sends an air interface message RRCReconfigurationComplete to the base station, to indicate completion of RRC reconfiguration.

As an example, after service concurrency of the two SIM cards ends, if the service of the SIM card 2 ends, the UE sends the assistance information UEAssistanceInformation (for example, reducedMIMO-LayersFR1-UL is 2 layers, or no content is carried) to the network, and the network performs reconfiguration (for example, maxMIMO-Layers in PUSCH-ServingCellConfig is 2 layers, and maxRank in PUSCH-Config is 2 layers), to complete dynamic restoration of the UE capability corresponding to the SIM card 1.

It should be noted that, in this embodiment, a sum of the UE capability that is corresponding to the SIM card 1 and that is reported by the UE and the UE capability that is corresponding to the SIM card 2 and that is reported by the UE is greater than the capability specification of the UE. Optionally, the UE capability that is corresponding to the SIM card 1 and that is reported by the UE is equal to the capability specification of the UE, and the UE capability that is corresponding to the SIM card 2 and that is reported by the UE is equal to the capability specification of the UE. When a single SIM card has a service to be executed, the network may allocate, to the service of the SIM card, a resource that matches the capability specification of the UE, and the single SIM card of the UE may execute the service by using a high-specification UE capability, thereby improving performance of the UE. In a scenario of dual-SIM service concurrency, the two SIM cards share the resource corresponding to the capability specification of the UE, to implement service concurrency.

It should be noted that, in the foregoing procedure, step 603 and step 607 may alternatively be completed when the UE is powered on, that is, the UE completes reporting of the UE capability corresponding to the SIM card 1 and the UE capability corresponding to the SIM card 2 after being powered on.

Based on the foregoing process, resource configuration for the two SIM cards of the UE can be separately implemented, so that the UE can implement communication. In addition, the dual-SIM UE can support long-time service concurrency, and the sum of UE capabilities reported by the two SIM cards may be greater than the overall capability of the UE. In a scenario of service concurrency, the UE capability corresponding to the SIM card can be dynamically rolled back to ensure service experience in case of a conflict. In a scenario of service non-concurrency, the UE capability corresponding to the SIM card can be dynamically restored, and the SIM card of the UE can run with the high-specification capability, providing optimal user experience.

Figure 7A:
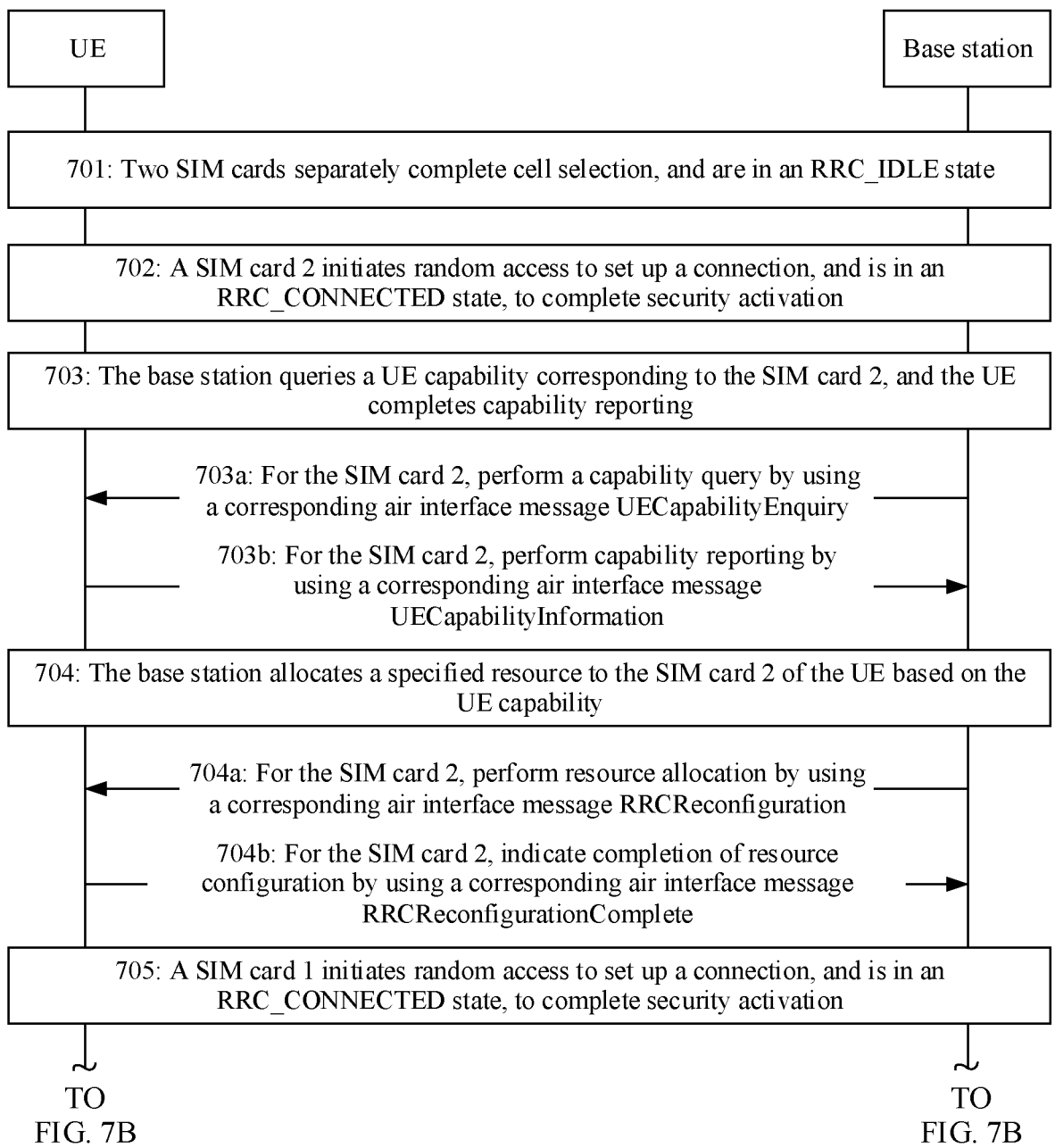

FIG. 7A and FIG. 7B are another schematic flowchart of communication of UE supporting concurrent dual-SIM services. In this embodiment, a SIM card 2 of the UE first initiates a service, and when the SIM card 1 subsequently needs to initiate a service, the SIM card 1 first performs a UE capability fallback. Specifically, the UE capability fallback is performed when a random access connection is initiated, and then the service of the SIM card 1 is initiated.

The method includes the following steps.

Step 701: The two SIM cards of the UE separately complete cell selection, and are in an RRC_IDLE state.

Step 702: The SIM card 2 of the UE initiates random access to set up a connection, and is in an RRC_CONNECTED state, to complete security activation.

Step 703: A base station queries a UE capability corresponding to the SIM card 2, and the UE completes capability reporting.

Step 703 includes the following step 703a and step 703b.

Step 703a: The base station performs a capability query on the UE. For example, the base station sends an air interface message UECapabilityEnquiry to the UE, to request to query the UE capability corresponding to the SIM card 2.

Step 703b: The UE reports the capability to the base station. For example, the UE sends an air interface message UECapabilityInformation to the base station, to report the UE capability corresponding to the SIM card 2.

In this step, the UE capability that is corresponding to the SIM card 2 and that is reported by the UE may be a capability specification of the UE (that is, an overall capability of the UE).

Step 704: The base station allocates a specified resource to the SIM card 2 of the UE based on the UE capability corresponding to the SIM card 2.

The resource allocated to the SIM card 2 of the UE includes a time domain resource, a frequency domain resource, a configured primary cell, a configured secondary cell, and the like.

Step 704 specifically includes the following step 704a and step 704b.

Step 704a: The base station performs resource allocation on the UE. For example, the base station sends an air interface message RRCReconfiguration to the UE, to request to perform RRC reconfiguration for the SIM card 2 of the UE.

In this step, the resource allocated to the SIM card 2 of the UE is a resource matching the UE capability that is corresponding to the SIM card 2 and that is reported by the UE.

Step 704b: The UE indicates completion of resource configuration to the base station. For example, the UE sends an air interface message RRCReconfigurationComplete to the base station, to indicate completion of RRC reconfiguration.

Step 705: The SIM card 1 of the UE initiates random access to set up a connection, and is in an RRC_CONNECTED state, to complete security activation.

Step 705 includes the following step 705a to step 705c.

Step 705a: The UE sends a random access connection setup request to the base station on an NUL. For example, the UE sends an air interface message RRCSetupRequest to the base station, to request to set up an air interface connection between the SIM card 1 and the base station.

Step 705b: The base station performs resource allocation on the UE. For example, the base station sends an air interface message RRCSetup to the UE, to request to perform RRC reconfiguration for the SIM card 1 of the UE.

In this step, the configured resources do not include an SUL.

Step 705c: The UE indicates completion of resource configuration to the base station. For example, the UE sends an air interface message RRCReconfigurationComplete to the base station, to indicate completion of RRC reconfiguration.

Step 706: The base station queries a UE capability corresponding to the SIM card 1, and the UE completes capability reporting.

Step 706 includes the following step 706a and step 706b.

Step 706a: The base station performs a capability query on the UE. For example, the base station sends an air interface message UECapabilityEnquiry to the UE, to request to query the UE capability corresponding to the SIM card 1.

Step 706b: The UE reports the capability to the base station. For example, the UE sends an air interface message UECapabilityInformation to the base station, to report the UE capability corresponding to the SIM card 1.

Step 707: The base station allocates a specified resource to the SIM card 1 of the UE based on the UE capability.

The resource allocated to the SIM card 1 of the UE includes a time domain resource, a frequency domain resource, a configured primary cell, a configured secondary cell, and the like.

Step 707 includes the following step 707a and step 707b.

Step 707a: The base station performs resource allocation on the UE. For example, the base station sends an air interface message RRCReconfiguration to the UE, to request to perform RRC reconfiguration for the SIM card 1 of the UE.

In this step, the configured resources do not include an SUL.

Step 707b: The UE indicates completion of resource configuration to the base station. For example, the UE sends an air interface message RRCReconfigurationComplete to the base station, to indicate completion of RRC reconfiguration.

It should be noted that, in this embodiment, a sum of the UE capability that is corresponding to the SIM card 1 and that is reported by the UE and the UE capability that is corresponding to the SIM card 2 and that is reported by the UE is greater than the capability specification of the UE. Optionally, the UE capability that is corresponding to the SIM card 1 and that is reported by the UE is equal to the capability specification of the UE, and the UE capability that is corresponding to the SIM card 2 and that is reported by the UE is equal to the capability specification of the UE. When a single SIM card has a service to be executed, the network may allocate, to the service of the SIM card, a resource that matches the capability specification of the UE, thereby improving overall performance of the UE. In a scenario of dual-SIM service concurrency, the two SIM cards share the resource corresponding to the capability specification of the UE, to implement service concurrency.

It should be noted that, in the foregoing procedure, step 703 and step 706 may alternatively be completed when the UE is powered on, that is, the UE completes reporting of the UE capability corresponding to the SIM card 1 and the UE capability corresponding to the SIM card 2 after being powered on.

Based on the foregoing process, resource configuration for the two SIM cards of the UE can be separately implemented, so that the UE can implement communication. In addition, the dual-SIM UE can support long-time service concurrency, and the sum of UE capabilities reported by the two SIM cards may be greater than the overall capability of the UE. In a scenario of service concurrency, the UE capability corresponding to the SIM card can be dynamically rolled back to ensure service experience in case of a conflict. In a scenario of service non-concurrency, the UE capability corresponding to the SIM card can be dynamically restored, and the SIM card of the UE can run with the high-specification capability, providing optimal user experience.

Figure 8:
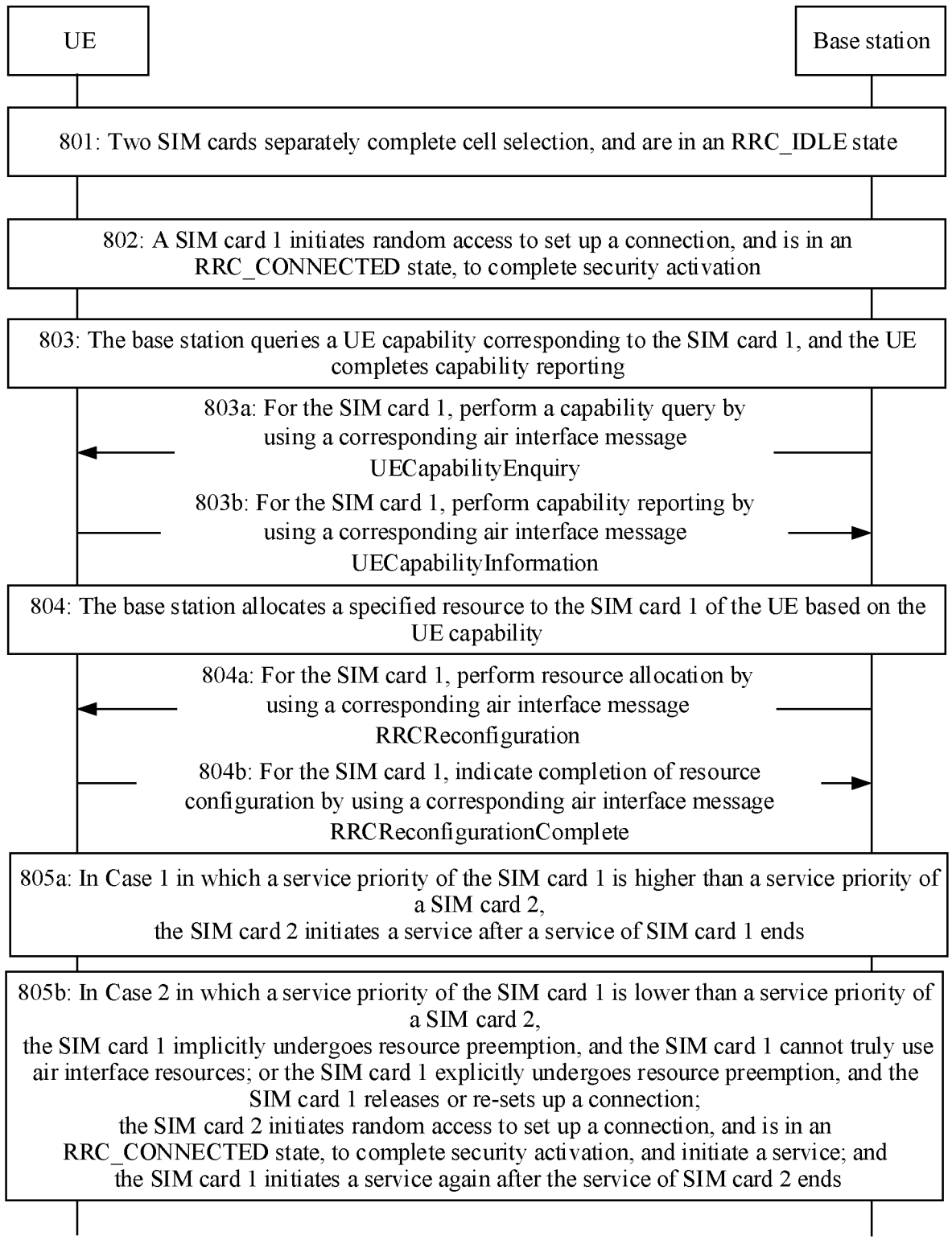

FIG. 8 is another schematic flowchart of communication of UE supporting concurrent dual-SIM services. In this embodiment, it is considered that in some scenarios, the UE may not be able to perform a UE capability fallback, or the fallback cannot be successful within a specific time range, the UE may select a manner of serial execution of services of the SIM card 1 and the SIM card 2. The execution manner may be used as a minimum manner.

The method includes the following steps.

Step 801: The two SIM cards of the UE separately complete cell selection, and are in an RRC_IDLE state.

Step 802: The SIM card 1 of the UE initiates random access to set up a connection, and is in an RRC_CONNECTED state, to complete security activation.

Step 803: The base station queries a UE capability corresponding to the SIM card 1, and the UE completes capability reporting.

Step 803 includes the following step 803a and step 803b.

Step 803a: The base station performs a capability query on the UE. For example, the base station sends an air interface message UECapabilityEnquiry to the UE, to request to query the UE capability corresponding to the SIM card 1.

Step 803b: The UE reports the capability to the base station. For example, the UE sends an air interface message UECapabilityInformation to the base station, to report the UE capability corresponding to the SIM card 1.

In this step, the UE capability that is corresponding to the SIM card 1 and that is reported by the UE may be an overall capability of the UE.

Step 804: The base station allocates a specified resource to the SIM card 1 of the UE based on the UE capability corresponding to the SIM card 1.

The resource allocated to the SIM card 1 of the UE includes a time domain resource, a frequency domain resource, a configured primary cell, a configured secondary cell, and the like.

Step 804 includes the following step 804a and step 804b.

Step 804a: The base station performs resource allocation on the UE. For example, the base station sends an air interface message RRCReconfiguration to the UE, to request to perform RRC reconfiguration for the SIM card 1 of the UE.

In this step, the resource allocated to the SIM card 1 of the UE is a resource matching the UE capability that is corresponding to the SIM card 1 and that is reported by the UE. For example, if the UE capability that is corresponding to the SIM card 1 and that is reported by the UE is the overall capability of the UE, the resource allocated to the SIM card 1 of the UE in this step is a resource matching the overall capability of the UE.

Step 804b: The UE indicates completion of resource configuration to the base station. For example, the UE sends an air interface message RRCReconfigurationComplete to the base station, to indicate completion of RRC reconfiguration.

Then, if the SIM card 2 has a service to be executed, it is determined, based on priorities between a service of the SIM card 1 and the service of the SIM card 2, to perform the following step 805a or step 805b.

Case 1: When a service priority of the SIM card 1 is higher than a service priority of the SIM card 2, the following step 805a is performed.

Step 805a: After a service of the SIM card 1 ends, the SIM card 2 initiates a service.

Specifically, the SIM card 2 may perform operations similar to those of the SIM card 1 in step 802 to step 804 to complete resource configuration, and then the SIM card 2 initiates the service.

Case 2: When a service priority of the SIM card 1 is lower than a service priority of the SIM card 2, the following step 805b is performed.

Step 805b: The SIM card 1 implicitly undergoes resource preemption, and the SIM card 1 cannot truly use air interface resources; or the SIM card 1 explicitly undergoes resource preemption, and the SIM card 1 releases or re-sets up a connection. Then, the SIM card 2 initiates random access to set up a connection, and is in an RRC_CONNECTED state, to complete security activation, and initiate a service. After the service of SIM card 2 ends, the SIM card 1 initiates a service again.

That is, execution of the service of the SIM card 1 is suspended, and after execution of the service of the SIM card 2 is completed, execution of the service of the SIM card 1 is continued.

It should be noted that, in the foregoing procedure, step 803 may alternatively be completed when the UE is powered on, that is, the UE completes reporting of the UE capability corresponding to the SIM card 1 after being powered on. Similarly, the UE may alternatively complete reporting of the UE capability corresponding to the SIM card 2 after being powered on.

Based on the foregoing process, resource configuration for the two SIM cards of the UE can be separately implemented, so that the UE can implement communication. A sum of UE capabilities reported by the two SIM cards may be greater than the overall capability of the UE. Each SIM card can perform serial execution on different services based on a highest specification capability of the UE, maximizing utilization of the UE capability.

Figure 9:
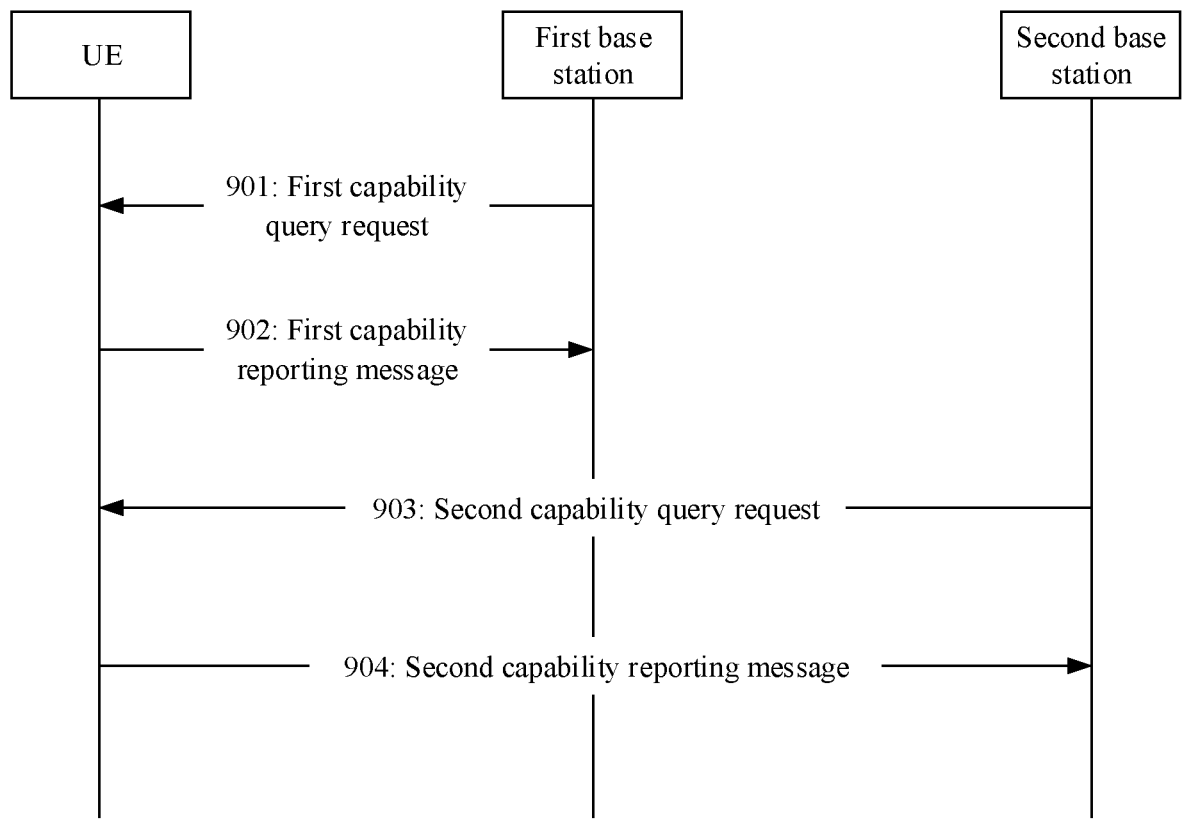

FIG. 9 is another schematic flowchart of communication of UE supporting concurrent dual-SIM services. The UE has a first SIM card (or referred to as a SIM card 1) and a second SIM card (or referred to as a SIM card 2), the first SIM card corresponds to a first user (or referred to as a user 1), and the second SIM card corresponds to a second user (or referred to as a user 2).

In this embodiment, a first base station and a second base station may be a same base station, or may be different base stations. For example, if the SIM card 1 and the SIM card 2 of the UE belong to different operators, the first base station corresponding to the SIM card 1 and the second base station corresponding to the SIM card 2 may be different base stations. If the SIM card 1 and the SIM card 2 of the UE belong to a same operator, the first base station corresponding to the SIM card 1 and the second base station corresponding to the SIM card 2 may be a same base station, or may be different base stations.

The method includes the following steps.

Step 901: The first base station sends a first capability query request to the UE, and correspondingly, the UE receives the first capability query request.

The first capability query request is used to query a first UE capability corresponding to the first user.

Step 902: The UE sends a first capability reporting message to the first base station, and correspondingly, the base station receives the first capability reporting message.

The first capability reporting message carries indication information of the first UE capability. That is, the first capability reporting message carries indication information, the indication information indicates the first UE capability, and the first UE capability is a UE capability corresponding to the first user.

Step 903: The second base station sends a second capability query request to the UE, and correspondingly, the UE receives the second capability query request.

The second capability query request is used to query a second UE capability corresponding to the second user.

Step 904: The UE sends a second capability reporting message to the second base station, and correspondingly, the base station receives the second capability reporting message.

The second capability reporting message carries indication information of the second UE capability. That is, the second capability reporting message carries indication information, the indication information indicates the second UE capability, and the second UE capability is a UE capability corresponding to the second user.

Neither the first UE capability nor the second UE capability is greater than a capability specification of the UE, the capability specification of the UE is shared by the first user and the second user, and a sum of the first UE capability and the second UE capability is greater than the capability specification of the UE.

Based on the foregoing solution, a UE capability reported by a single user may be higher than that in the conventional technology, and a sum of a reported UE capability corresponding to the first user and a reported UE capability corresponding to the second user is greater than the capability specification of the UE. Therefore, when the single user has a service to be executed, the base station may allocate corresponding resources to the service of the user based on a reported higher UE capability corresponding to the user. Performance of the UE in a scenario in which the single user has a service to be executed can be improved compared with that in the conventional technology. Because a scenario of service concurrency does not always exist, using the foregoing solution helps improve overall performance of UE with a plurality of SIM cards.

In a possible implementation method, the capability specification of the UE includes one or more of the following:

(1) maximum quantity of cells supported by the UE for carrier aggregation;
(2) maximum quantity of multi-input multi-output MIMO layers supported by the UE; and
(3) supplementary uplink feature of the UE.

For specific descriptions of the capability specification of the UE, refer to the foregoing descriptions. Details are not described again.

The capability specification of the UE is shared by the first user and the second user. Therefore, when only a single user on the UE has a service to be executed, the network side may allocate corresponding resources to the user based on the UE capability corresponding to the user. For example, if the first user accesses an internet, makes a call, or the like, and the second user has no service, the first base station may allocate corresponding resources to the first user based on the first UE capability that is corresponding to the first user and that is reported by the UE. The resources allocated to the first user do not exceed a maximum resource quantity corresponding to the capability specification of the UE. For another example, if the second user accesses an internet, makes a call, or the like, and the first user has no service, the second base station may allocate corresponding resources to the second user based on the second UE capability that is corresponding to the second user and that is reported by the UE. The resources allocated to the second user do not exceed the maximum resource quantity corresponding to the capability specification of the UE. When two users on the UE simultaneously have services to be executed (for example, the first user accesses an interne, and the second user performs paging or is paged), the first base station may allocate corresponding resources to the first user based on the first UE capability corresponding to the first user, and the second base station may allocate corresponding resources to the second user based on the second UE capability corresponding to the second user. In addition, a sum of the resources allocated to the first user and the resources allocated to the second user does not exceed the maximum resource quantity corresponding to the capability specification of the UE. To be specific, both the first user and the second user can use only some of capabilities of the UE.

Because the sum of the first UE capability and the second UE capability is greater than the capability specification of the UE, when the first user and the second user have services to be concurrently executed, to ensure that a sum of a UE capability used by the first user and a UE capability used by the second user does not exceed the capability specification of the UE, a UE capability actually configured for the first user and/or a UE capability actually configured for the second user may be appropriately reduced before service concurrency.

It should be noted that the first UE capability that is corresponding to the first user and that is reported by the UE refers to an upper limit of the UE capability corresponding to the first user, and the second UE capability that is corresponding to the second user and that is reported by the UE refers to an upper limit of the UE capability corresponding to the second user. Subsequently, when the first user and the second user have concurrent services, and when a fallback needs to be performed on the UE capability corresponding to the first user, the UE may notify in a specific manner the first base station of a UE capability after the fallback, that is, a UE capacity actually used by the first user. Alternatively, when a fallback needs to be performed on the UE capability corresponding to the second user, the UE may notify in a specific manner the second base station of a UE capability after the fallback, that is, a UE capability actually used by the second user. It should be noted that the first UE capability corresponding to the first user does not change, and the UE capability actually used by the first user may be rolled back or restored based on a service requirement, that is, the UE capability actually used by the first user may change. Similarly, the second UE capability corresponding to the second user does not change, and the UE capability actually used by the second user may be rolled back or restored based on a service requirement, that is, the UE capability actually used by the second user may change.

Then, when the two users have services to be concurrently executed, in this embodiment of this application, a terminal capability corresponding to one of the users may be actively rolled back, to reduce a terminal capability that needs to be occupied by the user, so that a part of a terminal capability may be reserved for the other user, thereby implementing service concurrency. For example, when it is determined that the first user is executing a first service and the second user needs to initiate a second service, or it is determined that the first user needs to initiate a first service and the second user is executing a second service, this embodiment of this application provides different capability fallback methods, including but not limited to the following.

Method 1: The UE sends a capability fallback message to the first base station. The capability fallback message is used to reduce the UE capability used by the first user.

For example, when the first user is executing the first service and the second user needs to initiate the second service, a terminal capability used by the first user is reduced by sending the capability fallback message, and a part of a terminal capability may be reserved for the second user, so that a second terminal device can execute the second service, thereby implementing concurrent execution of the first service and the second service. For another example, when the first user needs to initiate the first service and the second user is executing the second service, a terminal capability used by the first user is reduced by sending the capability fallback message, so that a sum of the terminal capability used by the first user and a terminal capability used by the second user does not exceed the capability specification of the terminal, and the first user can execute the first service, thereby implementing concurrent execution of the first service and the second service.

Optionally, the capability fallback message carries first assistance information, and the first assistance information carries one or more pieces of the following information: indication information indicating a quantity of cells except a primary cell to which a capability of the UE is to be reduced; indication information indicating a maximum bandwidth to which the capability of the UE is to be reduced at a low frequency; indication information indicating a maximum bandwidth to which the capability of the UE is to be reduced at a high frequency; indication information indicating a quantity of downlink MIMO layers to which the capability of the UE is to be reduced at a low frequency; indication information indicating a quantity of uplink MIMO layers to which the capability of the UE is to be reduced at a low frequency; indication information indicating a quantity of downlink MIMO layers to which the capability of the UE is to be reduced at a high frequency; indication information indicating a quantity of uplink MIMO layers to which the capability of the UE is to be reduced at a high frequency; and indication information indicating that the UE does not support a supplementary uplink.

Optionally, the first assistance information is UEAssistanceInformation.

As an example, the capability specification of the UE includes: A maximum quantity of uplink MIMO layers supported by the low frequency of the UE is 4. The first UE capability that is corresponding to the first user and that is reported by the UE to the first base station includes: The maximum quantity of uplink MIMO layers supported by the low frequency of the UE is 4, and the UE sends the first assistance information to the first base station. The first assistance information carries indication information indicating that a quantity of downlink MIMO layers to which the low frequency of the UE is to be reduced is 2, to notify the first base station that a maximum quantity of MIMO layers actually used by the first user is 2.

Method 2: Send a sounding reference signal to the first base station through N transmit ports, where N is less than a quantity of uplink MIMO layers corresponding to the first user.

The transmit port herein is an antenna port used to send a sounding reference signal.

Based on the foregoing solution, if the sounding reference signal is sent to a first access device through the N transmit ports, that a quantity of uplink MIMO layers is N is indicated to the first access device, and N is less than the quantity of uplink MIMO layers corresponding to the first user, that is, the first access device is indicated to reduce the quantity of uplink MIMO layers to N. In this way, a terminal capability used by the first user can be reduced. For example, when the first user is executing the first service and the second user needs to initiate the second service, the terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, the terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

In an example, the first user capability that is corresponding to the first user and that is reported by the UE includes that a maximum quantity of uplink MIMO layers supported by the low frequency of the UE is 4, and the first base station configures the first user to send an SRS through four antenna ports. Subsequently, when the first user wants to reduce an actually used UE capability, the UE may send the SRS to the first base station on less than four antenna ports (three antenna ports are used as an example). When the first base station receives the SRS on the three antenna ports, the first base station reduces a quantity of low frequency uplink MIMO layers corresponding to the first user to 3 or less, to reduce a UE capability actually used by the first user.

Method 3: Send channel state information to the first base station. The channel state information carries a rank indication, the rank indication indicates that a quantity of downlink MIMO layers is the same as a value corresponding to the rank indication, and the quantity of downlink MIMO layers is less than or equal to a quantity of downlink MIMO layers corresponding to the first user.

Based on the foregoing solution, the channel state information carrying the rank indication is sent, to indicate that the quantity of downlink MIMO layers is the same as the value corresponding to the rank indication, that is, indicate an access device to reduce the quantity of downlink MIMO layers to the value corresponding to the rank indication. In this way, a terminal capability used by the first user can be reduced. For example, when the first user is executing the first service and the second user needs to initiate the second service, the terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, the terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

For example, the first user capability that is corresponding to the first user and that is reported by the UE includes that a maximum quantity of downlink MIMO layers supported by the low frequency of the UE is 4. Subsequently, when the first user wants to reduce an actually used UE capability, the UE may send the channel state information to the first base station. The channel state information carries the rank indication, and the value corresponding to the rank indication is less than 4 (3 is used as an example). When the first base station receives the channel state information, the first base station reduces a quantity of low frequency downlink MIMO layers corresponding to the first user to 3 or less, to reduce a UE capability actually used by the first user.

Method 4: Use a primary cell corresponding to the first user, instead of a secondary cell corresponding to the first user.

Based on the foregoing solution, the primary cell corresponding to the first user is used, but the secondary cell corresponding to the first user is not used, to simulate a scenario in which the secondary cell has no signal, to trigger the first access device to determine to delete the secondary cell. In this way, a terminal capability used by the first user can be reduced. For example, when the first user is executing the first service and the second user needs to initiate the second service, the terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, the terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

Method 5: Send a measurement report to the first base station. The measurement report does not include a measurement report of a secondary cell corresponding to the first user.

Based on the foregoing solution, the terminal does not report the measurement report of the secondary cell corresponding to the first user to the first access device, to indicate the first access device not to add the secondary cell. In this way, a terminal capability currently supported by the first user can be reduced. For example, when the first user is executing the first service and the second user needs to initiate the second service, a terminal capability used by the first user is reduced, and a part of a terminal capability may be reserved for the second user, so that a second terminal device can execute the second service, thereby implementing concurrent execution of the first service and the second service. For another example, when the first user needs to initiate the first service and the second user is executing the second service, a terminal capability used by the first user is reduced, so that a sum of the terminal capability used by the first user and a terminal capability used by the second user does not exceed the capability specification of the terminal, and the first user can execute the first service, thereby implementing concurrent execution of the first service and the second service.

Subsequently, after the first service or the second service ends, a UE capability used by the first user may be restored. In a possible implementation method, a capability restoration message is sent to the first base station. The capability restoration message is used to improve the UE capability used by the first user.

Optionally, the capability restoration message carries second assistance information, and the second assistance information carries one or more pieces of the following information: indication information indicating a quantity of cells except a primary cell to which the capability of the UE is to be increased; indication information indicating a maximum bandwidth to which the capability of the UE is to be increased at a low frequency; indication information indicating a maximum bandwidth to which the capability of the UE is to be increased at a high frequency; indication information indicating a quantity of downlink MIMO layers to which the capability of the UE is to be increased at a low frequency; indication information indicating a quantity of uplink MIMO layers to which the capability of the UE is to be increased at a low frequency; indication information indicating a quantity of downlink MIMO layers to which the capability of the UE is to be increased at a high frequency; indication information indicating a quantity of uplink MIMO layers to which the capability of the UE is to be increased at a high frequency; and indication information indicating that the UE supports a supplementary uplink.

Optionally, the second assistance information is UEAssistanceInformation.

Optionally, the capability restoration message does not carry any parameter, and the capability restoration message indicates to restore all suppressed parameters, that is, restore to parameters before the UE capability is reduced.

Figure 10:
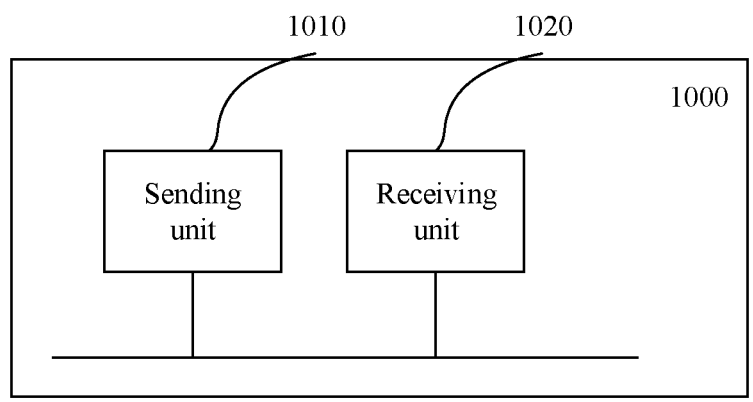
FIG. 10 and FIG. 11 are schematic diagrams of a communication apparatus.

FIG. 10 is a schematic diagram of a communication apparatus according to an embodiment of this application. The communication apparatus 1000 includes a sending unit 1010 and a receiving unit 1020. The communication apparatus is configured to implement steps corresponding to the terminal in the foregoing embodiments.

The receiving unit 1020 is configured to receive a first capability query request from a first access device, where first capability query request is used to query a first terminal capability corresponding to a first user; and receive a second capability query request from a second access device, where the second capability query request is used to query a second terminal capability corresponding to a second user. The sending unit 1010 is configured to send a first capability reporting message to the first access device, where the first capability reporting message carries indication information of the first terminal capability; and send a second capability reporting message to the second access device, where the second capability reporting message carries indication information of the second terminal capability. Neither the first terminal capability nor the second terminal capability is greater than a capability specification of the terminal, the capability specification of the terminal is shared by the first user and the second user, and a sum of the first terminal capability and the second terminal capability is greater than the capability specification of the terminal.

In a possible implementation method, the capability specification of the terminal includes one or more of the following: a maximum quantity of cells supported by the terminal for carrier aggregation; a maximum quantity of multi-input multi-output MIMO layers supported by the terminal; and a supplementary uplink feature of the terminal.

In a possible implementation method, the sending unit 1010 is further configured to send a capability fallback message to the first access device. The capability fallback message is used to reduce a terminal capability used by the first user.

In a possible implementation method, that the sending unit 1010 is configured to send a capability fallback message to the first access device specifically includes: sending the capability fallback message to the first access device when the first user is executing a first service and the second user needs to initiate a second service.

In a possible implementation method, that the sending unit 1010 is configured to send a capability fallback message to the first access device specifically includes: sending the capability fallback message to the first access device when the first user needs to initiate a first service and the second user is executing a second service.

In a possible implementation method, the capability fallback message carries first assistance information, and the first assistance information carries one or more pieces of the following information: indication information indicating a quantity of cells except a primary cell to which a capability of the terminal is to be reduced; indication information indicating a maximum bandwidth to which the capability of the terminal is to be reduced at a low frequency; indication information indicating a maximum bandwidth to which the capability of the terminal is to be reduced at a high frequency; indication information indicating a quantity of downlink MIMO layers to which the capability of the terminal is to be reduced at a low frequency; indication information indicating a quantity of uplink MIMO layers to which the capability of the terminal is to be reduced at a low frequency; indication information indicating a quantity of downlink MIMO layers to which the capability of the terminal is to be reduced at a high frequency; indication information indicating a quantity of uplink MIMO layers to which the capability of the terminal is to be reduced at a high frequency; and indication information indicating that the terminal does not support a supplementary uplink.

In a possible implementation method, the first assistance information is UEAssistanceInformation.

In a possible implementation method, the sending unit 1010 is further configured to send a sounding reference signal to the first access device through N transmit ports, where N is less than a quantity of uplink MIMO layers corresponding to the first user.

In a possible implementation method, the sending unit 1010 is further configured to send channel state information to the first access device. The channel state information carries a rank indication, the rank indication indicates that a quantity of downlink MIMO layers is the same as a value corresponding to the rank indication, and the quantity of downlink MIMO layers is less than or equal to a quantity of downlink MIMO layers corresponding to the first user.

In a possible implementation method, a primary cell corresponding to the first user is used, but a secondary cell corresponding to the first user is not used.

In a possible implementation method, the sending unit 1010 is further configured to send a measurement report to the first access device. The measurement report does not include a measurement report of a secondary cell corresponding to the first user.

In a possible implementation method, the sending unit 1010 is further configured to send a capability restoration message to the first access device. The capability restoration message is used to improve the terminal capability used by the first user.

In a possible implementation method, the capability restoration message carries second assistance information, and the second assistance information carries one or more pieces of the following information: indication information indicating a quantity of cells except a primary cell to which the capability of the terminal is to be increased; indication information indicating a maximum bandwidth to which the capability of the terminal is to be increased at a low frequency; indication information indicating a maximum bandwidth to which the capability of the terminal is to be increased at a high frequency; indication information indicating a quantity of downlink MIMO layers to which the capability of the terminal is to be increased at a low frequency; indication information indicating a quantity of uplink MIMO layers to which the capability of the terminal is to be increased at a low frequency; indication information indicating a quantity of downlink MIMO layers to which the capability of the terminal is to be increased at a high frequency; indication information indicating a quantity of uplink MIMO layers to which the capability of the terminal is to be increased at a high frequency; and indication information indicating that the terminal supports a supplementary uplink.

In a possible implementation method, the second assistance information is UEAssistanceInformation.

Optionally, the communication apparatus may further include a storage unit. The storage unit is configured to store data or instructions (which may also be referred to as code or programs). The foregoing units may interact with or be coupled to the storage unit, to implement a corresponding method or function. The coupling in this embodiment of this application may be an indirect coupling or a communication connection between apparatuses, units, or modules in an electrical form, a mechanical form, or another form, and is used for information exchange between the apparatuses, the units, or the modules.

In this embodiment of this application, division into the units in the communication apparatus is merely logical function division. In an actual implementation, all or some of the units may be integrated into one physical entity, or may be physically separated. In addition, all the units in the communication apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the communication apparatus for implementation. In addition, each unit may alternatively be stored in a memory in a form of a program to be invoked by a processing element of the communication apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in any one of the foregoing communication apparatuses may be one or more integrated circuits configured to implement the foregoing methods, for example, one or more ASICs, or one or more microprocessors (or DSPs), or one or more FPGAs, or a combination of at least two of these integrated circuit forms. For another example, when the units in the communication apparatus may be implemented in a form of scheduling a program by a processing element, the processing element may be a general-purpose processor, for example, a CPU or another processor that can invoke the program. For still another example, the units may be integrated and implemented in a form of a SoC.

Figure 11:
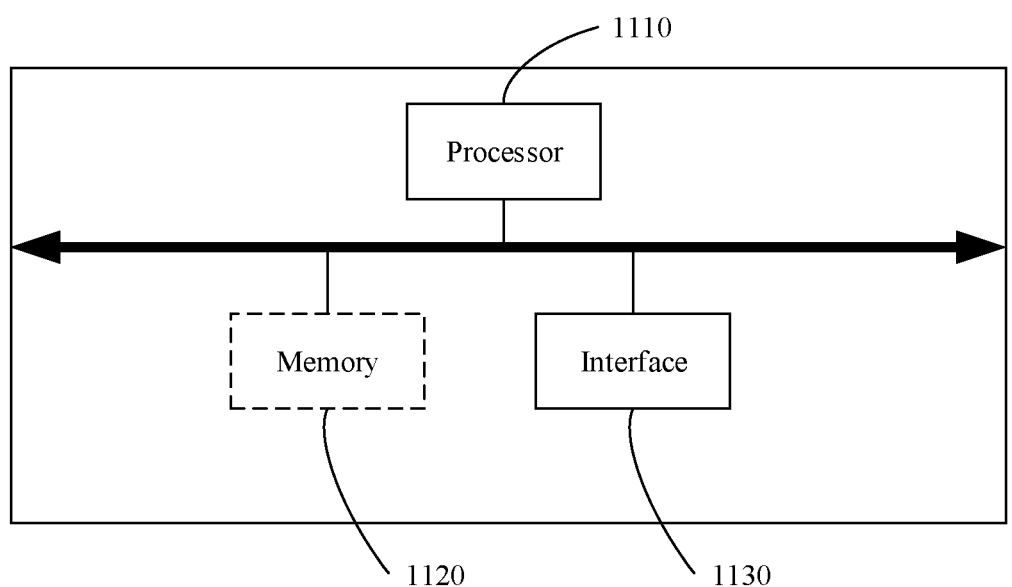

FIG. 11 is a schematic diagram of a communication apparatus according to an embodiment of this application. The communication apparatus is configured to implement operations of the terminal device in the foregoing embodiments. As shown in FIG. 11, the communication apparatus includes a processor 1110 and an interface 1130. Optionally, the communication apparatus further includes a memory 1120. The interface 1130 is configured to communicate with another device. In this embodiment of this application, the interface may also be referred to as a communication interface, and a specific form of the interface may be a transceiver, a circuit, a bus, a module, a pin, or a communication interface of another type.

The method performed by the terminal in the foregoing embodiments may be implemented by the processor 1110 by invoking a program stored in a memory (which may be the memory 1120 in the terminal or may be an external memory). That is, the terminal may include the processor 1110, and the processor 1110 invokes the program in the memory, to perform the method performed by the terminal in the foregoing method embodiments. The processor herein may be an integrated circuit having a signal processing capability, for example, a CPU. The terminal may be implemented by using one or more integrated circuits configured to implement the foregoing method, for example, one or more ASICs, one or more microprocessors DSPs, one or more FPGAs, or a combination of at least two of the integrated circuit forms. Alternatively, the foregoing implementations may be combined.

Specifically, the processor 1110 in the communication apparatus shown in FIG. 11 may invoke computer-executable instructions stored in the memory 1120, to implement a function/an implementation process of the sending unit 1010 and the receiving unit 1020 in FIG. 10. Alternatively, a function/an implementation process of the sending unit 1010 and the receiving unit 1020 in FIG. 10 may be implemented through the interface 1130 in the communication apparatus 1100 shown in FIG. 11.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (SSD), or may be a volatile memory such as a RAM. The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

A person skilled in the art may understand that first, second, and various reference numerals in embodiments of this application are for distinguishing only for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of the present disclosure.

All or a part of the technical solutions provided in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a terminal device, a network device, an artificial intelligence device, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state disk (SSD)), or the like.

In embodiments of this application, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method implemented by a terminal, wherein the communication method comprises:
   receiving, from a first access device, a first capability query request to query a first terminal capability corresponding to a first user;
   sending, to the first access device, a first capability reporting message carrying first indication information of the first terminal capability;
   receiving, from a second access device, a second capability query request to query a second terminal capability corresponding to a second user; and
   sending, to the second access device, a second capability reporting message carrying second indication information of the second terminal capability,
   wherein the first terminal capability and the second terminal capability are less than or equal to a capability specification that is of the terminal, wherein the terminal is a dual-SIM dual-active (DSDA) terminal, wherein the capability specification is shared by the first user and the second user, wherein a sum of the first terminal capability and the second terminal capability is greater than the capability specification, and wherein the capability specification comprises one or more of:
  a maximum quantity of cells supported by the terminal for carrier aggregation;
  a maximum quantity of multi-input multi-output (MIMO) layers supported by the terminal; or
  a supplementary uplink feature of the terminal.

2. The communication method of claim 1, further comprising sending, to the first access device, a capability fallback message to reduce the first terminal capability.

3. The communication method of claim 2, further comprising sending, to the first access device, the capability fallback message when the first user is executing a first service and the second user initiates a second service.

4. The communication method of claim 2, further comprising sending, to the first access device, the capability fallback message when the first user initiates a first service and the second user is executing a second service.

5. The communication method of claim 2, wherein the capability fallback message carries first assistance information, and wherein the first assistance information carries one or more pieces of indication information indicating:
  a first quantity of cells except a primary cell to which a capability of the terminal is to be reduced;
  a maximum bandwidth to which the capability is to be reduced at a first low frequency;
  a maximum bandwidth to which the capability is to be reduced at a first high frequency;
  a second quantity of downlink MIMO layers to which the capability is to be reduced at a second low frequency;
  a third quantity of uplink MIMO layers to which the capability is to be reduced at a third low frequency;
  a fourth quantity of downlink MIMO layers to which the capability is to be reduced at a second high frequency;
  a fifth quantity of uplink MIMO layers to which the capability is to be reduced at a third high frequency; or
  that the terminal does not support a supplementary uplink.

6. The communication method of claim 5, wherein the first assistance information is UEAssistanceInformation.

7. The communication method of claim 2, further comprising sending, to the first access device, a capability restoration message to improve the first terminal capability.

8. The communication method of claim 7, wherein the capability restoration message carries second assistance information, and wherein the second assistance information carries one or more pieces of indication information indicating:
  a first quantity of cells except a primary cell to which a capability of the terminal is to be increased;
  a maximum bandwidth to which the capability is to be increased at a first low frequency;
  a maximum bandwidth to which the capability is to be increased at a first high frequency;
  a second quantity of downlink MIMO layers to which the capability of the terminal is to be increased at a second low frequency;
  a third quantity of uplink MIMO layers to which the capability of the terminal is to be increased at a third low frequency;
  a fourth quantity of downlink MIMO layers to which the capability of the terminal is to be increased at a second high frequency;
  a fifth quantity of uplink MIMO layers to which the capability of the terminal is to be increased at a third high frequency; and
  that the terminal supports a supplementary uplink.

9. The communication method of claim 1, further comprising sending a sounding reference signal to the first access device through N transmit ports, wherein N is less than a quantity of uplink MIMO layers corresponding to the first user.

10. The communication method of claim 1, further comprising sending, to the first access device, channel state information carrying a rank indication, wherein the rank indication indicates that a first quantity of downlink MIMO layers is the same as a value corresponding to the rank indication, and wherein the first quantity is less than or equal to a second quantity of downlink MIMO layers corresponding to the first user.

11. The communication method of claim 1, further comprising using a primary cell corresponding to the first user.

12. The communication method of claim 1, further comprising sending, to the first access device, a first measurement report, wherein the first measurement report does not comprise a second measurement report of a secondary cell corresponding to the first user.

13. A terminal comprising:
  a memory configured to store instructions; and
  a processor coupled to the memory and configured to:
    receive, from a first access device, a first capability query request to query a first terminal capability corresponding to a first user;
    send, to the first access device, a first capability reporting message carrying first indication information of the first terminal capability;
    receive, from a second access device, a second capability query request to query a second terminal capability corresponding to a second user; and
    send, to the second access device, a second capability reporting message carrying second indication information of the second terminal capability,
  wherein the first terminal capability and the second terminal capability are less than or equal to a capability specification of the terminal,
  wherein the terminal is a dual-SIM dual-active (DSDA) terminal,
  wherein the capability specification is shared by the first user and the second user,
  wherein a sum of the first terminal capability and the second terminal capability is greater than the capability specification, and
  wherein the capability specification comprises one or more of:
    a maximum quantity of cells supported by the terminal for carrier aggregation;
    a maximum quantity of multi-input multi-output (MIMO) layers supported by the terminal; or
    a supplementary uplink feature of the terminal.

14. The terminal of claim 13, wherein the processor is further configured to send, to the first access device, a capability fallback message to reduce the first terminal capability.

15. The terminal of claim 14, wherein the processor is further configured to send, to the first access device, the capability fallback message when the first user is executing a first service and the second user needs to initiate a second service.

16. The terminal of claim 14, wherein the processor is further configured to send, to the first access device, the capability fallback message when the first user needs to initiate a first service and the second user is executing a second service.

17. The terminal of claim 13, wherein the processor is further configured to send a sounding reference signal to the first access device through N transmit ports, and wherein N is less than a quantity of uplink MIMO layers corresponding to the first user.

18. A computer program product comprising computer-executable instructions that are stored on a non-transitory computer-readable storage medium and that, when executed by a processor, cause a terminal to:
receive, from a first access device, a first capability query request to query a first terminal capability corresponding to a first user;
send, to the first access device, a first capability reporting message carrying first indication information of the first terminal capability;
receive, from a second access device, a second capability query request to query a second terminal capability corresponding to a second user; and
send, to the second access device, a second capability reporting message carrying second indication information of the second terminal capability,
wherein the first terminal capability and the second terminal capability is are less than or equal to a capability specification of a terminal,
wherein the terminal is a dual-SIM dual-active (DSDA) terminal,
wherein the capability specification is shared by the first user and the second user,
wherein a sum of the first terminal capability and the second terminal capability is greater than the capability specification, and
wherein the capability specification comprises one or more of:
a maximum quantity of cells supported by the terminal for carrier aggregation;
a maximum quantity of multi-input multi-output (MIMO) layers supported by the terminal; or
a supplementary uplink feature of the terminal.

19. The computer program product of claim 18, wherein the instructions that, when executed by the processor, cause the terminal to send, to the first access device, a capability fallback message to reduce the first terminal capability.

20. The computer program product of claim 19, wherein the instructions that, when executed by the processor, cause the terminal to send, to the first access device, the capability fallback message when the first user is executing a first service and the second user needs to initiate a second service.

* * * * *